(12) United States Patent
Kaneko et al.

(10) Patent No.: US 7,868,097 B2
(45) Date of Patent: Jan. 11, 2011

(54) HYBRID POLYMER AND METHOD FOR PRODUCTION THEREOF

(75) Inventors: Hideyuki Kaneko, Ichihara (JP); Shinichi Kojoh, Ichihara (JP); Nobuo Kawahara, Sodegaura (JP); Shingo Matsuo, Chiba (JP); Tomoaki Matsugi, Ichihara (JP); Norio Kashiwa, Minato (JP)

(73) Assignee: Mitsui Chemicals, Inc., Tokyo (JP)

( * ) Notice: Subject to any disclaimer, the term of this patent is extended or adjusted under 35 U.S.C. 154(b) by 55 days.

(21) Appl. No.: 11/816,738

(22) PCT Filed: Feb. 21, 2006

(86) PCT No.: PCT/JP2006/303025

§ 371 (c)(1),
(2), (4) Date: Aug. 21, 2007

(87) PCT Pub. No.: WO2006/088197

PCT Pub. Date: Aug. 24, 2006

(65) Prior Publication Data
US 2009/0076233 A1    Mar. 19, 2009

(30) Foreign Application Priority Data

Feb. 21, 2005  (JP) ............... 2005-044847
Jul. 8, 2005   (JP) ............... 2005-199999
Jul. 8, 2005   (JP) ............... 2005-200002
Aug. 25, 2005  (JP) ............... 2005-245077

(51) Int. Cl.
   C08F 291/04   (2006.01)
   C08F 255/02   (2006.01)
   C08F 255/04   (2006.01)
   C08F 255/06   (2006.01)
   C08F 255/08   (2006.01)

(52) U.S. Cl. ............ 525/245; 525/210; 525/211; 525/242; 525/244; 525/299; 525/302; 525/308; 525/309; 525/294; 525/313; 525/298; 525/296; 525/314; 525/319; 525/320; 525/321; 525/322; 525/323; 525/324; 525/356; 525/359.3; 525/359.4; 525/326.1; 525/333.7; 525/334.1

(58) Field of Classification Search ............ 526/206; 525/192, 244, 245, 416, 326.1, 333.7, 334.1, 525/242, 298, 302, 319–324, 308–309, 210–211, 525/299, 294, 296, 313–314, 356, 359.3, 525/359.4
See application file for complete search history.

(56) References Cited

U.S. PATENT DOCUMENTS

| | | | | |
|---|---|---|---|---|
| 5,212,248 A | * | 5/1993 | Knoll et al. ............ | 525/245 |
| 5,362,817 A | * | 11/1994 | Osman ............... | 525/334.1 |
| 5,854,349 A | | 12/1998 | Abe et al. | |
| 6,576,722 B2 | * | 6/2003 | Coca et al. ............ | 526/111 |
| 7,022,763 B2 | * | 4/2006 | Matsugi et al. ............ | 525/63 |
| 2004/0225054 A1 | * | 11/2004 | Coca et al. ............ | 524/504 |
| 2006/0013958 A1 | * | 1/2006 | Connelly et al. ............ | 427/402 |
| 2006/0264577 A1 | * | 11/2006 | Faust et al. ............ | 525/242 |

FOREIGN PATENT DOCUMENTS

| | | |
|---|---|---|
| CN | 1165831 | 11/1997 |
| EP | 1408058 | 4/2004 |
| EP | 1645576 | 4/2006 |
| EP | 1964865 | 9/2008 |
| FR | 1602517 | 12/1970 |
| JP | 62-158709 | 7/1987 |
| JP | 62167371 A * | 7/1987 |
| JP | 01-201302 | 8/1989 |
| JP | 08109218 | 4/1996 |
| JP | 10-152539 | 6/1998 |
| JP | 10-287703 | 10/1998 |
| JP | 2000-038494 | 2/2000 |
| JP | 2002-037825 | 2/2002 |
| JP | 2002145944 | 5/2002 |
| JP | 2004131620 | 4/2004 |
| JP | 2004-300411 | 10/2004 |
| JP | 2005-048172 | 2/2005 |
| TW | 387904 | 4/2000 |
| WO | 9802472 | 1/1998 |
| WO | 9840415 | 9/1998 |
| WO | 0222712 | 3/2002 |
| WO | 2005005503 | 1/2005 |

OTHER PUBLICATIONS

Derwent Abstract of JP 62167371A.*
English machine translation of JP 2002-137025.*
Vasile (Handbook of Polyolefins. Second Edition. Marcel Dekker, Inc., New York. © 2000. pp. 171-172.).*

(Continued)

*Primary Examiner*—Milton I Cano
*Assistant Examiner*—Brieann R Fink
(74) *Attorney, Agent, or Firm*—Rankin Hill & Clark LLP

(57) ABSTRACT

A hybrid polymer has a structure in which a polyolefin segment and a polar polymer segment are connected not via a bonding group containing a heteroatom. A method of the invention produces the hybrid polymer with industrial advantages. The hybrid polymer includes a polyolefin segment (A) and a polar polymer segment (B), the polar polymer segment being obtained by radical polymerization of a radically polymerizable monomer.

5 Claims, No Drawings

OTHER PUBLICATIONS

Eastman Chlorinated Polyolefin 343-1 (100% Solids) Product Data Sheet. May 15, 2003.*

Shengsheng (Synthesis of Novel Linear Polyethene-Based Graft Copolymers by Atom Transfer Radical Polymerization. Macromolecules 2001, 34, 1529-1532).*

International Search Report for PCT/JP2006/303025 dated May 16, 2006.

International Search Report for PCT/JP2006303025 Mailed Jul. 21, 2009.

Krzysztof Matyjaszewski and Jianhui Xia; Atom Transfer Radical Polymerization; Chemical Reviews, 2001,vol. 101, No. 9, pp. 2921-2990.

Chinese Office Action dated Jul. 10, 2009, corresponding to U.S. Appl. No. 11/816,738, filed on Aug. 21, 2007.

Taiwanese Office Action dated Apr. 8, 2009 corresponding to U.S. Appl. No. 11/816,738, filed on Apr. 8, 2009.

* cited by examiner

HYBRID POLYMER AND METHOD FOR PRODUCTION THEREOF

This application is a 371 national stage of International Application PCT/JP2006/303025, filed Feb. 21, 2006.

TECHNICAL FIELD

The present invention relates to a hybrid polymer and a method for production thereof.

BACKGROUND ART

Polyolefins such as polyethylene and polypropylene are lightweight and inexpensive, and have excellent physical properties and processability. On the other hand, their high chemical stability is an obstacle in achieving high functions such as printability, coating property, adhesion, heat resistance, impact resistance, hydrophilicity, stimulation responsiveness, and compatibility with a polymer having polarity. This defect of polyolefins is widely compensated for by copolymerizing ethylene and a polar group-containing monomer such as vinyl acetate or methacrylic acid ester by a high-pressure radical polymerization method, or by grafting a polyolefin with a polar group-containing monomer such as maleic anhydride in the presence of a peroxide. In addition, Japanese Patent Application Laid-Open (JP-A) No. 8-109218 discloses a method in which a polyolefin is obtained by polymerization and an end of the polyolefin is modified. JP-A No. 2002-145944 discloses a method of copolymerizing an olefin and a polar group-containing monomer. By these methods, various polyolefins having polar groups are obtained. However, the polyolefins obtained by these methods generally contain only a small amount of polar groups. Moreover, the polar group-containing monomers are separate from one another in the olefin chain. Even if the polar group-containing monomers form a chain, there will most often be a few such chains. Accordingly, coating property, adhesion, and compatibility with a polar resin are not sufficient in some cases.

A solution to such problems will be hybrid polymers composed of a so-called polar polymer segment in which polar group-containing polymers are linked, and a polyolefin segment.

As a method of producing such a polymer, for example, WO 98/02472 discloses a method of preparing block polymers, in which an alkylboron-containing polyolefin is treated to convert the boron-containing group into a peroxide, and a monomer such as methyl methacrylate is caused to undergo radical polymerization.

In addition, JP-A No. 2004-131620 by the present applicant discloses a method in which a polyolefin obtained by copolymerization of an olefin and a polar group-containing monomer is treated to convert the polar group into a radical polymerization initiator, and a polar group-containing monomer such as methyl methacrylate is allowed to undergo radical polymerization.

Among the above methods, the former method entails use of an alkylboron-containing polyolefin which is prepared by introducing a boron compound in a polyolefin by modifying an unsaturated bond in the polyolefin with a special boron compound or by copolymerizing an olefin and a boron-containing olefin. However, the boron compounds are expensive and the step for modification or copolymerization adds costs, causing industrial disadvantages. Further, the peroxide used as the polymerization initiating site is chemically unstable and often causes nonuniform polymerization. Consequently, it is difficult to regulate the polymerization such that the resulting polar polymer segment has a desired polymerization degree and molecular weight. On the other hand, in the method in which the polyolefin obtained by copolymerization of an olefin and a polar group-containing monomer is treated to convert the polar group into a radical polymerization initiator, the radical polymerization proceeds in a relatively controlled manner such as so-called atom transfer radical polymerization or nitroxide-mediated radical polymerization. Therefore, the method is free of the problems of nonuniform polymerization and difficult control of polymerization degree and molecular weight of the resulting polar polymer. However, the preparation of the olefin/polar group-containing monomer copolymer as raw material for the radical polymerization initiator involves a special metallocene catalyst or addition of a large amount of alkylaluminum. Moreover, because of the presence of the polar group containing monomer, the polymerization efficiency is not high. Therefore, there is a need for a simpler method for converting a polyolefin into a radical polymerization initiator. In the methods described above, the polyolefin segment and the polar polymer segment are connected with a bonding group containing a heteroatom such as an ester linkage or an ether linkage. Therefore, the copolymers are susceptible to hydrolysis.

Further, CN 1165831 discloses a method of producing a grafted copolymer of a rubber and a radically polymerizable monomer. In the method, a raw material is a double bond-containing rubber, such as an ethylene-propylene-diene rubber and a styrene butadiene rubber, obtained by copolymerizing a diene compound. The raw material contains an allyl, which is halogenated. The halogenated rubber is used as a radical polymerization initiator for copolymerization with styrene or methylmethacrylate. According to this method, a hybrid polymer may be produced using a polyolefin-based rubber originally having a double bond in the molecule. However, the method is applicable only to diene copolymers as raw materials, and polyolefins which are commonly produced in the industry such as polyethylene and polypropylene cannot be used for the production of hybrid polymers.

For industrial use, the polymers are preferably produced in the form of powder having good properties. However, the polymers which are a polymer solution or molten in the polymerization reaction contain the polyolefin and polar polymer which are essentially different in properties. Therefore, it is extremely difficult to recover the polymers by an industrial useful technique such as reslurrying or crystallization. In addition, deashing is necessary in order to remove low-molecular residues such as a transition metal catalyst used in the radical polymerization, causing industrial disadvantages.

Patent Document 1: JP-A No. 8-109218
Patent Document 2: JP-A No. 2002-145944
Patent Document 3: WO 98/02472
Patent Document 4: JP-A No. 2004-131620
Patent Document 5: CN 1165831

DISCLOSURE OF THE INVENTION

Problems to be Solved by the Invention

The present invention has been made in view of the aforementioned background art. It is therefore an object of the invention to provide a novel hybrid polymer having such a structure that a polyolefin segment and a polar polymer segment are connected not via a bonding group containing a heteroatom, and an industrially advantageous method for producing such a hybrid polymer using a general-use polyolefin such as polyethylene or polypropylene which is widely produced in the industry.

Means for Solving the Problems

The present inventors studied the above problems, and have found a specific hybrid polymer capable of solving the problems, thereby completing the present invention.

That is, the present invention is as described in the following [1] to [12].

[1]

A hybrid polymer comprising a polyolefin segment (A) and a polar polymer segment (B), the polar polymer segment being obtained by radical polymerization of a radically polymerizable monomer.

[2]

A hybrid polymer having a structure in which a polyolefin segment (A) and a polar polymer segment (B) are connected together with a carbon-carbon bond, the polyolefin segment (A) being derived from a halogenated polyolefin (A') obtained by halogenating a polyolefin (A") which has a molecular weight distribution (Mw/Mn) of 1.5 or more and which is selected from the group consisting of the following (A1) to (A5), the polar polymer segment (B) being a homopolymer or a copolymer of one or more kinds of monomers selected from radically polymerizable monomers, (A1) a homopolymer or a copolymer of α-olefin compounds represented by $CH_2=CH—C_xH_{2x+1}$ (x is 0 or a positive integer), (A2) a copolymer of an α-olefin compound represented by $CH_2=CH—C_xH_{2x+1}$ (x is 0 or a positive integer) and a monoolefin compound having an aromatic ring, (A3) a copolymer of an α-olefin compound represented by $CH_2=CH—C_xH_{2x+1}$ (x is 0 or a positive integer) and a cyclic monoolefin compound represented by the following general formula (1), (A4) a random copolymer of an α-olefin compound represented by $CH_2=CH—C_xH_{2x+1}$ (x is 0 or a positive integer) and an unsaturated carboxylic acid or a derivative thereof, (A5) a polyolefin obtained by modifying the polymer represented by any of (A1) to (A4) with an unsaturated carboxylic acid or a derivative thereof,

[Chemical formula 1]

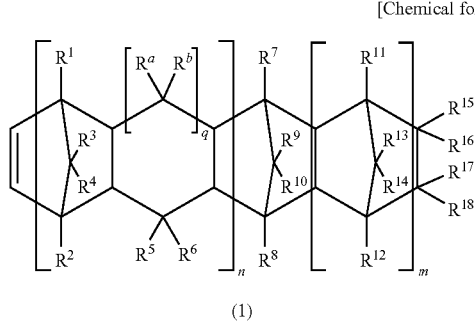

(1)

(In the formula (1), n is 0 or 1, m is 0 or a positive integer, q is 0 or 1, $R^1$ to $R^{18}$, $R^a$ and $R^b$ each represent independently an atom or a group selected from the group consisting of a hydrogen atom, a halogen atom and a hydrocarbon group, and $R^{15}$ to $R^{18}$ may be linked together to form a ring or rings).

[3]

The hybrid polymer according to [1] or [2], wherein the radically polymerizable monomer is an organic compound selected from (meth)acrylic acid and derivatives thereof, (meth)acrylonitrile, styrene and derivatives thereof, (meth)acrylamide and derivatives thereof, maleic acid and derivatives thereof, maleimide and derivatives thereof, vinyl esters, conjugated dienes, and halogen-containing olefins.

[4]

A method for producing the hybrid polymer as defined in [2] or [3], comprising polymerizing one or more monomers selected from radically polymerizable monomers, by atom transfer radical polymerization using the halogenated polyolefin (A') as a macro-initiator.

[5]

A method for producing the hybrid polymer as defined in any one of [2] to [4], wherein the halogenated polyolefin (A') is produced by a reaction of the polyolefin (A") and a halogenating agent.

[6]

The hybrid polymer according to [2], which is a powder comprising 1 to 99 parts by weight of the polyolefin segment (A) and 1 to 99 parts by weight of the polar polymer segment (B), and having a transition metal content of 100 ppm or less, an average particle diameter of 1 to 1000 μm and a bulk density of 0.10 to 0.90 g/cm³.

[7]

The hybrid polymer according to [6], which has a melt flow rate at 230° C. and a load of 2.16 kg in the range of 0.01 to 50 g/10 min.

[8]

A method for producing the hybrid polymer as defined in [6] or [7], comprising polymerizing a radically polymerizable monomer by atom transfer radical polymerization in a non-molten state using the halogenated polyolefin (A') as a macro-initiator, the halogenated polyolefin being a powder having an average particle diameter of 1 to 1000 μm and a bulk density of 0.10 to 0.50 g/cm³.

[9]

The method for producing the hybrid polymer according to [8], wherein the powder of the halogenated polyolefin (A') has an average particle diameter of 1 to 500 μm.

[10]

A thermoplastic resin composition comprising the hybrid polymer as defined in [1] or [2].

[11]

A film, a sheet, an adhesive resin, a compatibilizing agent, a resin modifier, a resin additive, a filler dispersant, or a dispersion, comprising the hybrid polymer as defined in [1] or [2].

EFFECT OF THE INVENTION

In the hybrid polymer of the present invention, a bonding group containing a heteroatom such as an oxygen atom or a nitrogen atom is not present at a bonding site between the polyolefin segment (A) and the polar polymer segment (B). Therefore, the hybrid polymer shows high chemical stability and has no possibility of cleavage at heating or hydrolysis under acidic or alkaline conditions. In addition, the method for producing a hybrid polymer of the present invention can produce a hybrid polymer by an industrially simple method by atom transfer radical-polymerizing a radically polymerizable monomer using, as a macro-initiator, a halogenated polyolefin produced by reacting a polyolefin such as polyethylene or polypropylene which is industrially widely produced, with a halogenating agent. In addition, the hybrid polymer of the present invention can be also useful as a compatibilizing agent.

MODE FOR CARRYING OUT THE INVENTION

The hybrid polymer of the present invention will be specifically explained below.

Herein, the polyolefins include random copolymers of an α-olefin and an unsaturated carboxylic acid or a derivative thereof.

The hybrid polymer related to the present invention has a polyolefin segment (A) and a polar polymer segment (B), which are usually connected together with a carbon-carbon bond. Herein, it is preferable that the polyolefin segment (A) is derived from a halogenated polyolefin (A') obtained by halogenating a polyolefin selected from the group consisting of (A1) to (A5) described above, and the polar polymer segment (B) is a homopolymer or a copolymer of one or more monomers selected from radically polymerizable monomers.

In the hybrid polymer of the present invention, the number average molecular weight of the polyolefin segment (A) is preferably in the range of 500 to 1,000,000, and the number average molecular weight of the polar polymer segment (B) is preferably in the range of 500 to 1,000,000.

<Polyolefin Segment (A)>

It is preferable that the polyolefin segment (A) is derived from a halogenated polyolefin (A') obtained by halogenating a polyolefin (A") selected from the group consisting of following (A1) to (A5). Herein, the number average molecular weight of the polyolefin (A") is preferably in the range of 500 to 1,000,000, more preferably 1,000 to 300,000. The polyolefin (A") has a molecular weight distribution (Mw/Mn) of 1.5 or more.

Herein, (A1) is a homopolymer or a copolymer of α-olefin compounds represented by $CH_2=CH-C_xH_{2x+1}$ (x is 0 or a positive integer), (A2) is a copolymer of an α-olefin compound represented by $CH_2=CH-C_xH_{2x+1}$ (x is 0 or a positive integer) and a monoolefin compound having an aromatic ring, (A3) is a copolymer of an α-olefin compound represented by $CH_2=CH-C_xH_{2x+1}$ (x is 0 or a positive integer) and a cyclic monoolefin compound represented by the following general formula (1), (A4) is a random copolymer of an α-olefin compound represented by $CH_2=CH-C_xH_{2x+1}$ (x is 0 or a positive integer) and an unsaturated carboxylic acid or a derivative thereof, and (A5) is a polyolefin obtained by modifying the polymer represented by any of (A1) to (A4) with an unsaturated carboxylic acid or a derivative thereof.

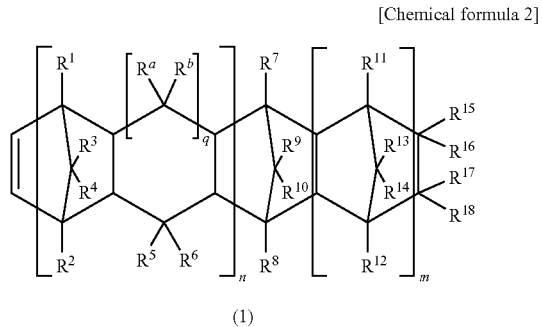

[Chemical formula 2]

(1)

In the formula (1), n is 0 or 1, m is 0 or a positive integer, and q is 0 or 1. When q is 1, $R^a$ and $R^b$ each represent independently the following atom or hydrocarbon group and, when q is 0, respective bonds are connected to form a 5-membered ring.

In the formula (1), $R^1$ to $R^{18}$, $R^a$ and $R^b$ each represent independently an atom or a group selected from the group consisting of a hydrogen atom, a halogen atom and a hydrocarbon group.

Herein, the halogen atom is a fluorine atom, a chlorine atom, a bromine atom or an iodine atom. As the hydrocarbon group for each of the above substituent groups, there are usually mentioned alkyl groups of 1 to 20 carbon atoms, halogenated alkyl groups of 1 to 20 carbon atoms, and cycloalkyl groups of 3 to 15 carbon atoms. More specifically, examples of the alkyl groups include a methyl group, an ethyl group, a propyl group, an amyl group, a hexyl group, an octyl group, a decyl group, a dodecyl group, and an octadecyl group; examples of the halogenated alkyl groups include groups obtained by substituting at least part of the hydrogen atoms in the above alkyl groups with a fluorine atom, a chlorine atom, a bromine atom or an iodine atom; and examples of the cycloalkyl groups include a cyclohexyl group.

These groups may contain a lower alkyl group. Further, in the general formula (1), $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ and $R^{17}$ may be taken together (or may mutually cooperate) to form a monocyclic or polycyclic structure. Examples of the monocyclic or polycyclic structures include the following:

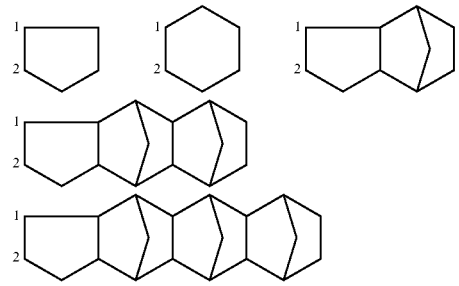

[Chemical formula 3]

In the above exemplary structures, each carbon atom marked with 1 or 2 represents a carbon atom to which $R^{15}$ ($R^{16}$) or $R^{17}$ ($R^{18}$) is bonded in the general formula (1).

Examples of the cyclic olefins represented by the general formula (1) include bicyclo[2.2.1]hept-2-ene derivatives, tricyclo[4.3.0.1$^{2,5}$]-3-decene derivatives, tricyclo[4.3.0.1$^{2,5}$]-3-undecene derivatives, tetracyclo[4.4.0.1$^{2,5}$.1$^{7,10}$]-3-dodecene derivatives, pentacyclo[7.4.0.1$^{2,5}$.1$^{9,12}$.0$^{8,13}$]-3-pentadecene derivatives, pentacyclo[6.5.1.1$^{3,6}$.0$^{2,7}$.0$^{9,13}$]-4-pentadecene derivatives, pentacyclo[8.4.0.1$^{2,3}$.1$^{9,12}$.0$^{8,13}$]-3-hexadecene derivatives, pentacyclo[6.6.1.1$^{3,6}$.0$^{2,7}$.0$^{9,14}$]-4-hexadecene derivatives, pentacyclopentadecadiene derivatives, hexacyclo[6.6.1.1$^{3,6}$.1$^{10,13}$.0$^{2,7}$.0$^{9,14}$]-4-heptadecene derivatives, heptacyclo[8.7.0.1$^{3,6}$.1$^{10,17}$.1$^{12,15}$.0$^{2,7}$.0$^{11,16}$]-4-eicosene derivatives, heptacyclo-5-eicosene derivatives, heptacyclo[8.8.0.1$^{4,7}$.1$^{11,18}$.1$^{13,16}$.0$^{3,8}$.0$^{12,17}$]-5-heneicosene derivatives, octacyclo[8.8.0.1$^{2,9}$.1$^{4,7}$.1$^{11,18}$.1$^{13,16}$.0$^{3,8}$.0$^{12,17}$]-5-docosene derivative, nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene derivatives, and nonacyclo[10.10.1.1$^{5,8}$.1$^{14,21}$.1$^{16,19}$.0$^{2,11}$.0$^{4,9}$.0$^{13,22}$.0$^{15,20}$]-5-hexacosene derivatives.

The aforementioned cyclic monoolefin compounds represented by the general formula (1) can be produced by Diels Alder reaction of a cyclopentadiene and an olefin having a corresponding structure. These cyclic olefins can be used alone or in combination of two or more kinds.

<<(A1) Homopolymer or Copolymer of α-olefin Compounds Represented by $CH_2=CH-C_xH_{2x+1}$ (x is 0 or a Positive Integer)>>

In the homopolymer or copolymer of α-olefin compounds $CH_2=CH-C_xH_{2x+1}$ (x is 0 or a positive integer) (A1) used in the present invention, examples of the α-olefin compounds $CH_2=CH-C_xH_{2x+1}$ (x is 0 or a positive integer) include straight or branched α-olefins of 4 to 20 carbon atoms such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene. Among these olefins, it is preferable to use at least one olefin selected from ethylene, propylene, 1-butene, 1-hexene, 4-methyl-1-pentene, and 1-octene.

The homopolymer or copolymer of an α-olefin compound represented by $CH_2=CH-C_xH_{2x+1}$ (x is 0 or a positive integer) (A1) used in the present invention is not particularly limited as long as it is obtained by homopolymerizing or copolymerizing the above α-olefin compound(s). Preferable examples include ethylene-based polymers such as low density polyethylene, medium density polyethylene, high density polyethylene, linear low density polyethylene, and ultrahigh-molecular polyethylene; propylene-based polymers such as propylene homopolymer, propylene random copolymer, and propylene block copolymer; polybutene, poly(4-methyl-1-pentene), poly(1-hexene), ethylene/propylene copolymer, ethylene/butene copolymer, ethylene/hexene copolymer, ethylene/octene copolymer, ethylene/(4-methyl-1-pentene) copolymer, propylene/butene copolymer, propylene/(4-methyl-1-pentene) copolymer, propylene/hexene copolymer, and propylene/octene copolymer.

<<(A2) Copolymer of α-olefin Compound Represented by $CH_2=CH-C_xH_{2x+1}$ (x is 0 or a Positive Integer) and Monoolefin Compound Having Aromatic Ring>>

In the copolymer of an α-olefin compound represented by $CH_2=CH-C_xH_{2x+1}$ (x is 0 or a positive integer) and a monoolefin compound having an aromatic ring (A2) used in the present invention, examples of the α-olefin compounds represented by $CH_2=CH-C_xH_{2x+1}$ (x is 0 or a positive integer) include the same α-olefin compounds as those described in (A1). Examples of the monoolefin compounds having an aromatic ring include styrene-based compounds such as styrene, vinyltoluene, α-methylstyrene, chlorostyrene, styrenesulfonic acid and salts thereof, and vinylpyridine. The copolymer of an α-olefin compound represented by $CH_2=CH-C_xH_{2x+1}$ (x is 0 or a positive integer) and a monoolefin compound having an aromatic ring (A2) used in the present invention is not particularly limited as long as it is obtained by copolymerizing the α-olefin compound and the monoolefin compound having an aromatic ring.

<<(A) Copolymer of α-olefin Compound Represented by $CH_2=CH-C_xH_{2x+1}$ (x is 0 or a Positive Integer) and Cyclic Monoolefin Compound Represented by the General Formula (1)>>

In the copolymer of an α-olefin compound represented by $CH_2=CH-C_xH_{2x+1}$ (x is 0 or a positive integer) and acyclic monoolefin compound represented by the general formula (1) (A3) used in the present invention, examples of the α-olefin compounds represented by $CH_2=CH-C_xH_{2+1}$ (x is 0 or a positive integer) include the same α-olefin compounds as those described in (A1). A constitutional unit derived from the cyclic monoolefin compound is represented by the following general formula (2).

[Chemical formula 4]

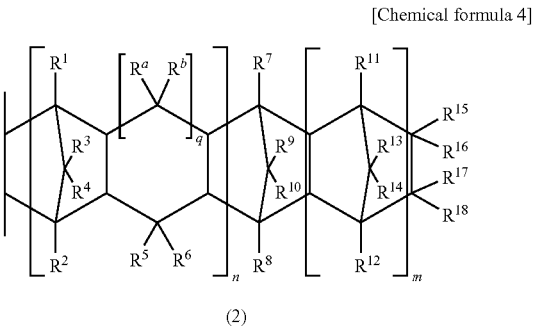

(2)

In the formula (2), n, m, q, $R^1$ to $R^{18}$, $R^a$ and $R^b$ are as defined in the formula (1).

<<(A4) Random Copolymer of α-olefin Compound Represented by $CH_2=CH-C_xH_{2x+1}$ (x is 0 or a Positive Integer) and Unsaturated Carboxylic Acid or Derivative Thereof)>>

In the random copolymer of an α-olefin compound represented by $CH_2=CH-C_xH_{2x+1}$ (x is 0 or a positive integer) and an unsaturated carboxylic acid or a derivative thereof (A4) used in the present invention, examples of the α-olefin compounds represented by $CH_2=CH-C_xH_{2x+1}$ (x is 0 or a positive integer) include the same α-olefin compounds as those described in (A1). Examples of the unsaturated carboxylic acids and derivatives thereof include unsaturated monocarboxylic acids and derivatives thereof, unsaturated dicarboxylic acids and derivatives thereof, and vinyl esters. Specific examples thereof include (meth)acrylic acid, (meth)acrylic acid esters, (meth)acrylic acid halides, (meth)acrylic acid amides, maleic acid, maleic anhydride, maleic acid esters, maleic acid halides, maleic acid amides, maleic acid imides, and aliphatic vinyl esters such as vinyl acetate and vinyl butyrate. The random copolymer of an α-olefin compound represented by $CH_2=CH-C_xH_{2x+1}$ (x is 0 or a positive integer) and an unsaturated carboxylic acid or a derivative thereof (A4) used in the present invention is not particularly limited as long as it is a random copolymer of the α-olefin compound and the unsaturated carboxylic acid or derivative thereof. Preferably, the random copolymer contains 50 mole % or more of the α-olefin compound.

<<(A5) Polyolefin Obtained by Modifying Polymer Represented by Any of (A1) to (A4) with Unsaturated Carboxylic Acid or Derivative Thereof>>

In the modified polyolefin obtained by modifying the polymer represented by any of (A1) to (A4) with an unsaturated carboxylic acid or a derivative thereof (A5) used in the present invention, specific examples of the unsaturated carboxylic acids and derivatives thereof include maleic acid, maleic anhydride, maleic acid esters, maleic acid halides, maleic acid amides, and maleic acid imides. For example, the polymer represented by any of (A1) to (A4) which is modified with the unsaturated carboxylic acid or derivative thereof may be obtained by reacting the polymer represented by any of (A1) to (A4) with the unsaturated carboxylic acid or derivative thereof in the presence of a radical generator such as an organic peroxide or in the presence of ultraviolet ray or radiation.

Conditions and methods for producing the polyolefin (A") selected from the group consisting of (A1) to (A5) used in the present invention are not particularly limited. Exemplary methods include coordination anion polymerization using known transition metal catalysts such as a Ziegler Natta catalyst, a metallocene catalyst, and a postmetallocene catalyst, and radical polymerization under a high pressure or with application of radiation. The polyolefin produced by these methods may be degraded using heat or radials.

In addition, it is necessary that the polyolefin segment (A) used in the present invention is composed of a monoolefin compound having only one carbon-carbon double bond or a monoolefin compound having an aromatic ring as described above. When a polymer is used which is obtained by copolymerizing the α-olefin compound with a compound having a plurality of carbon-carbon double bonds such as a straight diene compound such as hexadiene or octadiene, a styrene-based diene compound such as divinylbenzene, or a cyclic diolefin compound such as vinylnorbornene or ethylidenenorbornene, unsaturated bonds originating from the diene compound are mutually crosslinked at a stage of halogenation described later, and gelation results. Therefore, in the present invention, the polyolefin (A") to be halogenated is selected from the group consisting of (A1) to (A5), and these polyolefins may be used in combination of two or more kinds.

<<Halogenated Polyolefin (A')>>

The halogenated polyolefin (A') related to the present invention can be produced by halogenating the aforementioned polyolefin (A"). The halogen content of the halogenated polyolefin (A') is 0.01 to 70% by weight, preferably 0.02 to 50% by weight, further preferably 0.05 to 30% by weight. In the present invention, the halogen is selected from fluorine, chlorine, bromine and iodine, and a combination thereof may be used.

The halogenated polyolefin (A') related to the present invention has a structure in which at least one constitutional unit selected from constitutional units represented by the following general formulas (I) to (III) is at an end of the polymer main chain, and/or a structure in which at least one constitutional unit selected from constitutional units represented by the following general formulas (IV) to (VII) is inserted in the polymer main chain.

[Chemical formula 5]

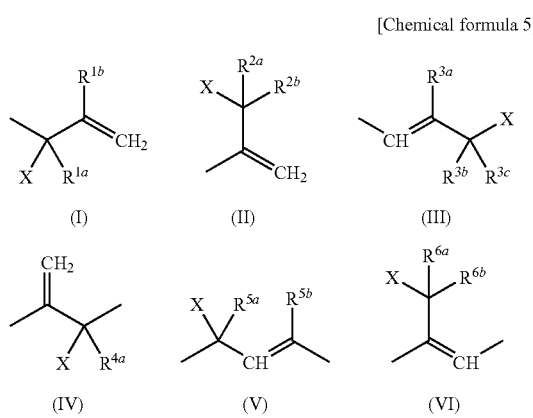

-continued

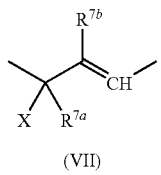

In the above general formulas (1) to (VII), X represents a halogen atom, and $R^{1a}$, $R^{1b}$, $R^{2a}$, $R^{2b}$, $R^{3a}$, $R^{3b}$, $R^{3c}$, $R^{4a}$, $R^{5a}$, $R^{5b}$, $R^{6a}$, $R^{6b}$, $R^{7a}$ and $R^{7b}$ may be the same or different, and represent a hydrogen atom, a halogen atom, a hydrocarbon group optionally substituted with one or more halogen atoms, an oxygen-containing group or a nitrogen-containing group.

Examples of the halogen atoms include fluorine, chlorine, bromine and iodine, with chlorine and bromine being preferable.

Examples of the hydrocarbon groups include straight or branched alkyl groups of 1 to 30, preferably 1 to 20 carbon atoms such as methyl, ethyl, n-propyl, isopropyl, n-butyl, isobutyl, sec-butyl, tert-butyl, neopentyl, and n-hexyl; straight or branched alkenyl groups of 2 to 30, preferably 2 to 20 carbon atoms such as vinyl, allyl, and isopropenyl; straight or branched alkynyl groups of 2 to 30, preferably 2 to 20 carbon atoms such as ethynyl, and propargyl; aryl groups of 6 to 30, preferably 6 to 20 carbon atoms such as phenyl, benzyl, naphthyl, biphenyl, terphenyl, phenanthryl, and anthracenyl; and alkyl-substituted aryl groups such as tolyl, iso-propylphenyl, t-butylphenyl, dimethylphenyl, and di-t-butylphenyl. The hydrocarbon groups may have their hydrogen atom(s) substituted with a halogen, and examples include halogenated hydrocarbon groups of 1 to 30, preferably 1 to 20 carbon atoms such as trifluoromethyl, pentafluorophenyl, and chlorophenyl. In addition, the hydrocarbon groups may be substituted with other hydrocarbon groups, and examples include aryl group-substituted alkyl groups such as benzyl, and cumyl. In addition, the hydrocarbon groups may be substituted with other hydrocarbon groups, and examples include aryl group-substituted alkyl groups such as benzyl, and cumyl.

The hydrocarbon groups may be substituted with oxygen-containing groups such as a heterocyclic compound residue, an alkoxy group, an aryloxy group, an ester group, an ether group, an acyl group, a carboxyl group, a carbonate group, a hydroxyl group, a peroxy group, and a carboxylic acid anhydride group, or nitrogen-containing groups such as an amino group, an imino group, an amido group, an imido group, a hydrazino group, a hydrazono group, a nitro group, a nitroso group, a cyano group, an isocyano group, a cyanic acid ester group, an amidino group, a diazo group, and an ammonium salt group originating from an amino group.

Among them, particularly preferable are straight or branched alkyl groups of 1 to 30, preferably 1 to 20 carbon atoms such as methyl, ethyl, n-propyl, isopropyl, n-butyl, isobutyl, sec-butyl, t-butyl, neopentyl, and n-hexyl; and aryl groups of 6 to 30, preferably 6 to 20 carbon atoms such as phenyl, naphthyl, biphenyl, terphenyl, phenanthryl, and anthracenyl. It is also preferable that these aryl groups are substituted with 1 to 5 substituents such as halogen atoms, alkyl groups or alkoxy groups of 1 to 30, preferably 1 to 20 carbon atoms, or aryl groups or aryloxy groups of 6 to 30, preferably 6 to 20 carbon atoms. The oxygen-containing group is a group containing 1 to 5 oxygen atoms in the group. Examples include an alkoxy group, an aryloxy group, an ester group, an ether group, an acyl group, a carboxyl group, a carbonate group, a hydroxyl group, a peroxy group, and a carboxylic acid anhydride group, with the alkoxy group, aryloxy group, acetoxy group, carbonyl group, and hydroxyl group being preferable. When the oxygen-containing group contains a carbon atom, the carbon atom number is desirably in the range of 1 to 30, preferably 1 to 20. Among these oxygen-containing groups, preferable examples of the alkoxy groups include methoxy, ethoxy, n-propoxy, isopropoxy, n-butoxy, isobutoxy, and tert-butoxy; preferable example of the aryloxy groups include phenoxy, 2,6-dimethylphenoxy, and 2,4,6-trimethylphenoxy; preferable examples of the acyl groups include formyl, acetyl, benzoyl, p-chlorobenzoyl, and p-methoxybenzoyl; and preferable examples of the ester groups include acetyloxy, benzoyloxy, methoxycarbonyl, phenoxycarbonyl, and p-chlorophenoxycarbonyl.

The nitrogen-containing group is a group containing 1 to 5 nitrogen atoms in the group. Examples include an amino group, an imino group, an amido group, an imido group, a hydrazino group, a hydrazono group, a nitro group, a nitroso group, a cyano group, an isocyano group, a cyanic acid ester group, an amidino group, a diazo group, and an ammonium salt group originating from an amino group, with the amino group, imino group, amido group, imido group, nitro group, and cyano group being preferable. When the nitrogen-containing group contains a carbon atom, the carbon atom number is desirably in the range of 1 to 30, preferably 1 to 20. Among these nitrogen-containing groups, preferable examples of the amido groups include acetamido, N-methylacetamido, and N-methylbenzamido; preferable examples of the amino groups include alkylamino groups such as methylamino, dimethylamino, diethylamino, dipropylamino, dibutylamino, and dicyclohexylamino, arylamino groups and alkylarylamino groups such as phenylamino, diphenylamino, ditolylamino, dinaphthylamino, and methylphenylamino; preferable examples of the imido groups include acetimido, and benzimido; and preferable examples of the imino groups include methylimino, ethylimino, propylimino, butylimino, and phenylimino.

Preferable configurations of the constitutional units represented by the general formulas (1) to (VII) will be exemplified by structural formulas.

[Exemplification of Preferable Configuration of Constitutional Unit Represented by the General Formula (I)]

[Chemical formula 6]

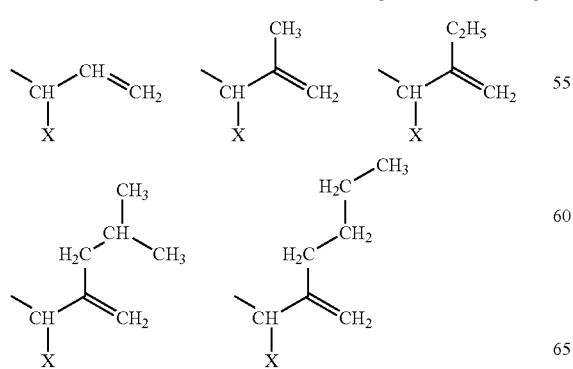

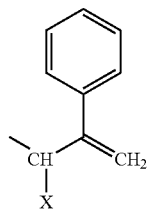

In the above formulas, X represents a halogen atom.

[Exemplification of Preferable Configuration of Constitutional Unit Represented by the General Formula (II)]

[Chemical formula 7]

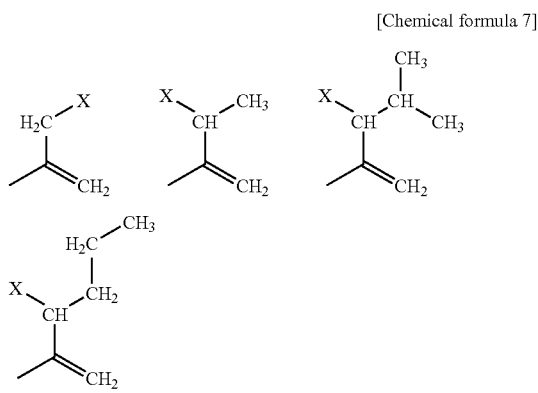

In the above formulas, X represents a halogen atom.

[Exemplification of Preferable Configuration of Constitutional Unit Represented by the General Formula (III)]

[Chemical formula 8]

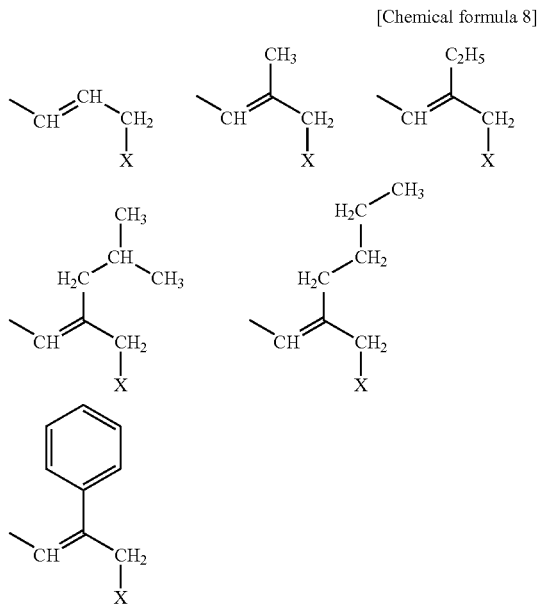

In the above formulas, X represents a halogen atom.

[Exemplification of Preferable Configuration of Constitutional Unit Represented by the General Formula (IV)]

[Chemical formula 9]

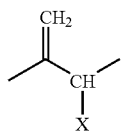

In the above formula, X represents a halogen atom.

[Exemplification of Preferable Configuration of Constitutional Unit Represented by the General Formula (V)]

[Chemical formula 10]

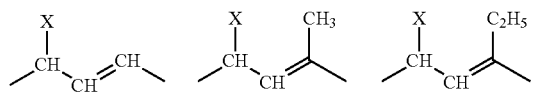

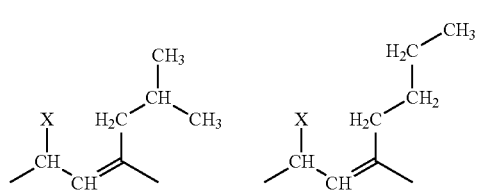

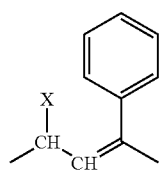

In the above formulas, X represents a halogen atom.

[Exemplification of Preferable Configuration of Constitutional Unit Represented by the General Formula (VI)]

[Chemical formula 11]

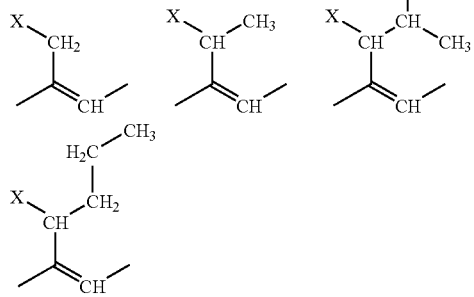

In the above formulas, X represents a halogen atom.

[Exemplification of Preferable Configuration of Constitutional Unit Represented by the General Formula (VII)]

[Chemical formula 12]

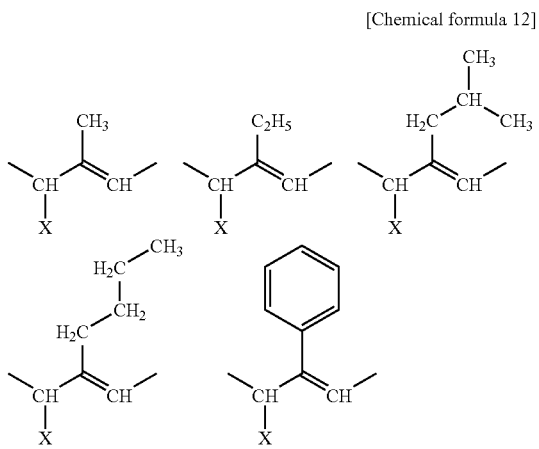

In the above formulas, X represents a halogen atom.

In addition, the halogenated polyolefin (A') related to the present invention may have a structure in which an end of the polymer main chain is terminated with at least one constitutional unit selected from the constitutional units represented by the general formulas (1) to (III) except that two hydrogen atoms are added to the carbon-carbon double bond and whereby the double bond is reduced to a carbon-carbon single bond, and/or a structure in which the polymer main chain includes but is not terminated with at least one constitutional unit selected from the constitutional units represented by the general formulas (IV) to (VII) except that two hydrogen atoms are added to the carbon-carbon double bond and whereby the double bond is reduced to a carbon-carbon single bond. Preferable configurations of such constitutional units are illustrated below.

[Chemical formula 13]

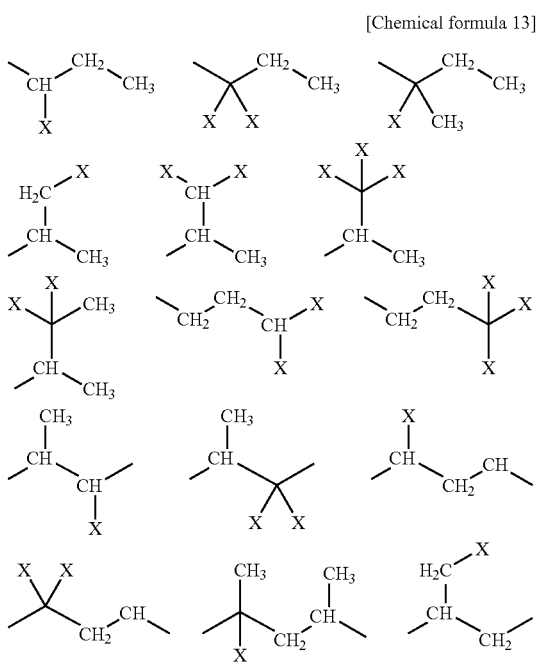

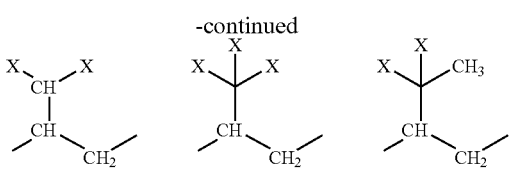

In the above formulas, X represents a halogen atom.

Herein, the polymer main chain refers to a part of the polymer molecular chain which is composed of a largest number of repeating units derived from the α-olefin and comonomer, that is, the longest chain structure of monomers. The polymer main chain has two ends. Therefore, the maximum number of the above constitutional units in the polymer molecular chain is two when the polymer main chain is terminated with at least one constitutional unit selected from the constitutional units represented by the general formulas (I) to (III) and corresponding constitutional units except that two hydrogen atoms are added to the carbon-carbon double bond and whereby the double bond is reduced to a carbon-carbon single bond. The number of the above constitutional units in the polymer molecular chain is not particularly limited when the polymer main chain includes but is not terminated with at least one constitutional unit selected from the constitutional units represented by the general formulas (IV) to (VII) and corresponding constitutional units except that two hydrogen atoms are added to the carbon-carbon double bond and whereby the double bond is reduced to a carbon-carbon single bond. However, when the number is too large, there is a possibility that the polyolefin will not show properties sufficiently. Therefore, the total number of the constitutional units represented by the general formulas (I) to (VII) and constitutional units corresponding to the formulas (I) to (VII) except that two hydrogen atoms are added to the carbon-carbon double bond and whereby the double bond is reduced to a carbon-carbon single bond, is preferably such that the halogen atom content is 0.01 to 70% by weight, more preferably 0.05 to 50% by weight. In addition, several kinds of these constitutional units may be contained in one polymer molecular chain. Among these constitutional units, the halogenated polyolefin (A1) preferably has a constitutional unit represented by any of the general formulas (I) to (VII) in which the unit has a carbon-carbon double bond and a halogen atom is added to the allyl position relative to the double bond. Like conventional chlorinated polyethylene and chlorinated polypropylene, such halogenated polyolefin may be used as adhesives and coating resins. Moreover, the reactivity of the carbon-carbon double bond in the molecule permits introduction of functional groups other than halogens and use of the polymer as a macromonomer for producing graft polymers.

The halogen atom content in the halogenated polyolefin (A') of the present invention can be measured by a method such as elementary analysis or ion chromatography, and is usually expressed in the unit of % by weight. The content of carbon-carbon double bonds in the halogenated polyolefin (A') of the present invention can be measured by a method such as an infrared spectrometry method or a nuclear magnetic resonance method (NMR), and is usually expressed in the unit of % by weight or mole %. Further, the halogen atoms bonded to the allyl position relative to the carbon-carbon double bond can be identified and determined by, for example, NMR. Specifically, the halogen atoms at the allyl position may be determined in the following manner as an example. A brominated polypropylene produced by the method of the invention is analyzed by proton NMR using deuterated orthodichlorobenzene as a solvent. Signals based on a carbon-carbon double bond are usually observed in the range of δ 4.5 to 6.0 ppm, and those assigned to a methylene group and a methine group at the allyl position to which a bromine atom is bonded are usually observed at δ 3.5 to 4.5 ppm. Since signals assigned to a bromomethylene group and a bromomethine group at other than the allyl position are usually observed at δ 3.0 to 3.5 ppm, whether a bromine atom is present at the allyl position or not can be easily identified. Further, for example, proton-proton two-dimensional NMR (HH-COSY) may be used in combination to analyze a correlation between the signals based on the carbon-carbon double bond and signals of the bromomethylene group and bromomethine group. On the other hand, the molecular weight of the halogenated polyolefin (A') of the present invention can be measured by, for example, gel permeation chromatography (GPC). The average content of carbon-carbon double bond per molecular chain may be calculated from the number average molecular weight (Mn) and a composition ratio (molar ratio) of the units in the halogenated polyolefin (A') (unit derived from each olefin monomer, unit to which the halogen is bonded, carbon-carbon double bond unit, etc.).

<<Method for Producing Halogenated Polyolefin (A')>>

The halogenated polyolefin (A') of the present invention can be produced by reacting the aforementioned polyolefin (A") and a halogenating agent.

The halogenating agent used in the present invention is not particularly limited as long as it can halogenate the polyolefin (A") into the halogenated polyolefin (A'). Examples include chlorine, bromine, iodine, phosphorus trichloride, phosphorus tribromide, phosphorus triiodide, phosphorus pentachloride, phosphorus pentabromide, phosphorus pentaiodide, thionyl chloride, sulfuryl chloride, thionyl bromide, N-chlorosuccinimide, N-bromosuccinimide, N-bromocaprolactam, N-bromophthalimide, 1,3-dibromo-5,5-dimethylhydantoin, N-chloroglutarimide, N-bromoglutarimide, N,N'-dibromoisocyanuric acid, N-bromoacetamide, N-bromocarbamic acid ester, dioxane dibromide, phenyltrimethylammonium tribromide, pyridinium hydrobromide perbromide, pyrrolidone hydrotribromide, t-butyl hypochlorite, t-butyl hypobromite, copper (II) chloride, copper (II) bromide, iron (III) chloride, oxalyl chloride, and IBr. Among them, preferable are chlorine, bromine, N-chlorosuccinimide, N-bromosuccinimide, N-bromocaprolactam, N-bromophthalimide, 1,3-dibromo-5,5-dimethylhydantoin, N-chloroglutarimide, N-bromoglutarimide, and N,N'-dibromoisocyanuric acid, and more preferable are bromine, and compounds having a N—Br bond such as N-bromosuccinimide, N-bromocaprolactam, N-bromophthalimide, 1,3-dibromo-5,5-dimethylhydantoin, N-bromoglutarimide, and N,N'-dibromoisocyanuric acid.

The reaction between the polyolefin (A") and the halogenating agent is preferably performed in an inert gas atmosphere. Examples of the inert gases include nitrogen, argon and helium. In the reaction of the present invention, if necessary, a solvent can be used. The solvent is not particularly limited as long as it does not inhibit the reaction. Examples include aromatic hydrocarbon-based solvents such as benzene, toluene and xylene; aliphatic hydrocarbon-based solvents such as pentane, hexane, heptane, octane, nonane and decane; alicyclic hydrocarbon-based solvents such as cyclohexane, methylcyclohexane and decahydronaphthalene; chlorinated hydrocarbon-based solvents such as chlorobenzene, dichlorobenzene, trichlorobenzene, methylene chloride, chloroform, carbon tetrachloride, tetrachloroethylene, and tetrachloroethane; alcohol-based solvents such as methanol, ethanol, n-propanol, iso-propanol, n-butanol, sec-butanol and tert-butanol; ketone-based solvents such as acetone, methyl ethyl ketone and methyl isobutyl ketone; ester-based solvents such as ethyl acetate and dimethyl phthalate; and ether-based solvents such as dimethyl ether, diethyl ether, di-n-amyl-ether, tetrahydrofuran and dioxyanisole. Preferable examples include aliphatic hydrocarbon-based solvents such as pentane, hexane, heptane, octane, nonane and decane; alicyclic hydrocarbon-based solvents such as cyclohexane, methylcyclohexane and decahydronaphthalene; and chlorinated hydrocarbon-based solvents such as chlorobenzene, dichlorobenzene, trichlorobenzene, methylene chloride, chloroform, carbon tetrachloride, tetrachloroethylene, and tetrachloroethane. These solvents may be used alone or in combination of two or more kinds. It is preferable that by use of these solvents, the reaction liquid forms a uniform phase, although there is no problem even if the reaction liquid is nonuniform with a plurality of phases.

In the reaction with the halogenating agent, if necessary, a radical initiator may be added in order to promote the reaction. Examples of the radical initiators include azo initiators such as azobisisobutyronitrile, azobis-2,4-dimethylvaleronitrile, azobiscyclohexanecarbonitrile, azobis-2-amidinopropane hydrochloride, dimethyl azobisisobutyrate, azobisisobutylamidine hydrochloride and 4,4'-azobis-4-cyanovaleric acid; peroxide-based initiators such as benzoyl peroxide, benzoyl 2,4-dichloroperoxide, di-tert-butyl-peroxide, lauroyl peroxide, acetyl peroxide, diisopropyl peroxydicarbonate, cumene hydroperoxide, tert-butyl hydroperoxide, dicumyl peroxide, p-menthane hydroperoxide, pinane hydroperoxide, methyl ethyl ketone peroxide, cyclohexanone peroxide, diisopropyl peroxydicarbonate, tert-butyl peroxylaurate, di-tert-butyl peroxyphthalate, dibenzyl oxide and 2,5-dimethylhexane-2,5-dihydroperoxide; and redox initiators such as benzoyl peroxide-N,N-dimethylaniline and peroxodisulfuric acid-sodium hydrogen sulfite. Among them, the azo initiators and the peroxide-based initiators are preferable. Further preferable are benzoyl peroxide, di-tert-butyl peroxide, lauroyl peroxide, acetyl peroxide, diisopropyl peroxydicarbonate, cumene hydroperoxide, tert-butyl hydroperoxide, dicumyl peroxide, azobisisobutyronitrile, azobis-2,4-dimethylvaleronitrile, azobiscyclohexanecarbonitrile, and dimethyl azobisisobutyrate. These radical initiators can be used alone, or two or more kinds can be used simultaneously or sequentially.

The polyolefin (A") and the halogenating agent may be reacted by various conventional methods. For example, the polyolefin (A") may be suspended or dissolved in a solvent, and the halogenating agent and, if necessary, the radical initiator may be admixed for reaction at a temperature of −80° C. to 250° C., preferably a temperature from room temperature to not more than a boiling point of the solvent. Alternatively, the polyolefin (A") may be brought into contact with the halogenating agent and, if necessary, the radical initiator at a temperature not less than a melting point of the polyolefin, for example, 180 to 300° C. by melt kneading.

By the aforementioned methods, the halogenated polyolefin (A') is produced.

<Polar Polymer Segment (B)>

The polar polymer segment (B) constituting the hybrid polymer related to the present invention is a homopolymer or a copolymer of one or more monomers selected from radically polymerizable monomers. Examples of the radically polymerizable monomers used in the present invention include (meth) acrylic acid-based monomers such as (meth) acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth) acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth) acrylate, decyl (meth)acrylate, dodecyl (meth)acrylate, phenyl (meth)acrylate, toluoyl (meth)acrylate, benzyl (meth) acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, 2-(dimethylamino)ethyl (meth)acrylate, γ-(methacryloyloxypropyl)trimethoxysilane, ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth) acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth) acrylate, 2-perfluorohexadecylethyl (meth)acrylate and the like; styrene-based monomers such as styrene, vinyltoluene, α-methylstyrene, chlorostyrene, styrenesulfonic acid and salts thereof; fluorine-containing vinyl monomers such as perfluoroethylene, perfluoropropylene, vinylidene fluoride and the like; silicon-containing vinyl-based monomers such as vinyltrimethoxysilane, vinyltriethoxysilane and the like; maleic anhydride, maleic acid, monoalkyl esters and dialkyl esters of maleic acid; fumaric acid, monoalkyl esters and dialkyl esters of fumaric acid; maleimide-based monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide and the like; nitrile group-containing vinyl-based monomers such as acrylonitrile, methacrylonitrile and the like; amido group-containing vinyl-based monomers such as (meth)acrylamide, N-methyl(meth) acrylamide, N-ethyl(meth)acrylamide, N-propyl(meth)acrylamide, N-isopropyl(meth)acrylamide, N-butyl(meth) acrylamide, N,N-dimethyl(meth)acrylamide and the like; vinyl ester-based monomers such as vinyl acetate, vinyl propionate, vinyl pivalate, vinyl benzoate, vinyl cinnamate and the like; olefin-based monomers such as ethylene, propylene, butene and the like; diene-based monomers such as butadiene, isoprene and the like; vinyl chloride, vinylidene chloride, allyl chloride, allyl alcohol and the like. These organic compounds may be used alone or in combination of two or more kinds.

The polar polymer segment (B) used in the present invention is preferably a polymer obtained by (co)polymerizing one or two or more monomers selected from (meth) acrylic acid and derivatives thereof, (meth) acrylonitrile, styrene and derivatives thereof, (meth)acrylamide and derivatives thereof, maleic acid and derivatives thereof, maleimide and derivatives thereof, vinyl esters, conjugated dienes, and halogen-containing olefins. More preferably, the polar polymer segment is a polymer obtained by (co)polymerizing one or two or more monomers selected from (meth)acrylic acid and derivatives thereof, (meth)acrylonitrile, styrene and derivatives thereof. Still more preferably, the polar polymer segment is a polymer obtained by homopolymerizing or copolymerizing (meth) acrylic acid esters, styrene, (meth) acrylamide, (meth)acrylonitrile, and (meth)acrylic acid.

<Hybrid Polymer>

The hybrid polymer of the present invention includes at least one kind of the polyolefin segment (A), and at least one kind of the polar polymer segment (B). The hybrid polymer of the present invention may have a plurality of the polyolefin segments (A) and polar polymer segments (B) which are different in composition and molecular weight.

The hybrid polymer of the present invention has a structure in which the polyolefin segment (A) and the polar polymer segment (B) are usually connected together with a carbon-carbon bond.

<<Powdery Hybrid Polymer>>

It is preferable that the hybrid polymer related to the present invention is a powdery polymer containing 1 to 99 parts by weight of the polyolefin segment (A) and 1 to 99 parts by weight of the polar polymer segment (B), and having a transition metal content of 100 ppm or less, an average particle diameter of 1 to 1000 μm and a bulk density of 0.10 to 0.90 g/cm$^3$.

The content of impurities such as a catalyst residue component is small, and the resin shows good properties. The content of a transition metal incorporated during polymerization is 100 ppm or less. More preferably, the polymer is white and has a transition metal content of 50 ppm or less. In addition, when the hybrid polymer related to the present invention is powdery, it is preferable that its average particle diameter is 1 to 1000 μm, and the bulk density measured by a method prescribed in JIS K6891 is in the range of 0.10 to 0.90 g/cm$^3$.

The powdery hybrid polymer related to the present invention is preferably such that the melt flow rate at 230° C. and a load of 2.16 kg is in the range of 0.010 to 50 g/10 min.

<Method for Producing Hybrid Polymer>

The hybrid polymer of the present invention is produced by atom transfer radical polymerization of one or more monomers selected from radically polymerizable monomers using the halogenated polyolefin (A') as a macro-initiator. The macro-initiator in the present invention is a polymer which is capable of initiating atom transfer radical polymerization, and which has an initiation site of atom transfer radical polymerization in the molecular chain.

The atom transfer radical polymerization in the present invention is living radical polymerization. In the general living radical polymerization, a radically polymerizable monomer is radically polymerized using an organic halide or a halogenated sulfonyl compound as an initiator, under catalysis of a metal complex having a transition metal as a central metal. Specifically, examples include methods in Matyjaszewski et al., Chem. Rev., 101, 2921 (2001), WO 96/30421, WO 97/18247, WO 98/01480, WO 98/40415, WO 00/156795, Sawamoto et al., Chem. Rev., 101, 3689 (2001), JP-A No. 8-41117, JP-A No. 9-208616, JP-A No. 2000-264914, JP-A No. 2001-316410, JP-A No. 2002-80523, and JP-A No. 2004-307872. Examples of the initiators to be used include organic halides and halogenated sulfonyl compounds. Particularly, a carbon-halogen bond at an α-position of a carbon-carbon double bond or a carbon-oxygen double bond, or a structure in which a plurality of halogens are bonded to one carbon atom is preferable as an initiator structure. In the halogenated polyolefin (A'), a carbon-halogen bond present at an α-position of a carbon-carbon double bond, or a structure in which a plurality of halogens are bonded to one carbon atom can be utilized as an initiator structure.

The hybrid polymer may be produced by the method of the present invention using the halogenated polyolefin (A') as a macro-initiator. Basically, a radically polymerizable monomer is polymerized by atom transfer radical polymerization in the presence of the modified polyolefin (A') under catalysis of a metal complex having a transition metal as a central metal.

The transition metal complex used as a polymerization catalyst is not particularly limited, but is preferably a metal complex in which the central metal is an element of Periodic Table Group 7, Group 8, Group 9, Group 10 or Group 11. Further preferable examples include complexes of zerovalent copper, monovalent copper, divalent ruthenium, divalent iron or divalent nickel. Inter alia, copper complexes are preferable. Examples of the monovalent copper compounds include cuprous chloride, cuprous bromide, cuprous iodide, cuprous cyanide, cuprous oxide, cuprous perchlorite and the like. When the copper compound is used, 2,2'-bipyridyl or a derivative thereof, 1,10-phenanthroline or a derivative thereof, or a polyamine such as tetramethylethylenediamine, pentamethyldiethylenetriamine or hexamethyltris(2-aminoethyl)amine is added as a ligand in order to enhance the catalyst activity. Alternatively, a tristriphenylphosphine complex of divalent ruthenium chloride (RuCl$_2$(PPh$_3$)$_3$) is also suitable as the catalyst. When the ruthenium compound is used as the catalyst, aluminum alkoxides as an activating agent are added. Further, a bistriphenylphosphine complex of divalent iron (FeCl$_2$(PPh$_3$)$_2$), a bistriphenylphosphine complex of divalent nickel (NiCl$_2$(PPh$_3$)$_2$), and a bistributylphosphine complex of divalent nickel (NiBr$_2$(PBu$_3$)$_2$) are also suitable as the catalyst.

Examples of the one or more monomers selected from radically polymerizable monomers include the same compounds as those described with respect to the polar polymer segment (B).

In the production method of the present invention, the polymerization method is not particularly limited. For example, bulk polymerization, solution polymerization, suspension polymerization, emulsion polymerization, and bulk/suspension polymerization can be applied. The radical polymerization in the present invention may use any solvent as long as it does not inhibit the reaction. Examples include aromatic hydrocarbon-based solvents such as benzene, toluene and xylene; aliphatic hydrocarbon-based solvents such as pentane, hexane, heptane, octane, nonane and decane; alicyclic hydrocarbon-based solvents such as cyclohexane, methylcyclohexane and decahydronaphthalene; chlorinated hydrocarbon-based solvents such as chlorobenzene, dichlorobenzene, trichlorobenzene, methylene chloride, chloroform, carbon tetrachloride and tetrachloroethylene; alcohol-based solvents such as methanol, ethanol, n-propanol, isopropanol, n-butanol, sec-butanol and tert-butanol; ketone-based solvents such as acetone, methyl ethyl ketone and methyl isobutyl ketone; ester-based solvents such as ethyl acetate and dimethyl phthalate; and ether-based solvents such as dimethyl ether, diethyl ether, di-n-amyl ether, tetrahydrofuran and dioxyanisole. Alternatively, the reaction may be performed by suspension polymerization or emulsion polymerization using water as a solvent. These solvents may be used alone or in combination of two or more kinds. It is preferable that by use of these solvents, the reaction liquid forms a uniform phase, although there is no problem even if the reaction liquid is nonuniform with a plurality of phases.

The reaction temperature is not limited as long as the radical polymerization reaction proceeds, and the temperature may be varied depending on a desired polymerization degree of the polymer, and types and amounts of the radical polymerization initiator and solvent used. Usually, the reaction temperature is −100° C. to 250° C., preferably −50° C. to 180° C., further preferably 0° C. to 160° C. The reaction may be performed under reduced pressure or normal pressure or under pressure depending on the case. It is preferable that the polymerization reaction is performed under an inert gas atmosphere such as nitrogen or argon.

The hybrid polymer produced by the above method is isolated by using a known method such as distillation-off of the solvent used in polymerization and unreacted monomers, or re-precipitation with a non-solvent. Further, by treating the resulting polymer with a polar solvent such as acetone or THF using a Soxhlet's extractor, a byproduct homoradical polymer can be removed.

<<Method for Producing Powdery Hybrid Polymer>>

The powdery hybrid polymer related to the present invention can be obtained by uniformly dissolving the hybrid polymer produced by the aforementioned method in a suitable solvent, and crystallizing the polymer. Alternatively, the hybrid polymer produced by the above method may be mechanically ground. Preferably, the powdery hybrid polymer is produced by polymerizing at least one radically polymerizable monomer by atom transfer radical polymerization in a non-molten state using the halogenated polyolefin (A') as a macro-initiator, the halogenated polyolefin being a powder having an average particle diameter of 1 to 1000 μm and a bulk density of 0.10 to 0.50 g/cm$^3$. It is more preferable that the average particle diameter of the powdery halogenated polyolefin (A') is 1 to 500 μm.

For industrial use, the hybrid polymer related to the present invention is preferably obtained with good properties and little impurities such as a catalyst component. Specifically, it is preferable that the polymer is a powder having an average particle diameter of 1 to 1000 μm and a bulk density of 0.10 to 0.90 g/cm$^3$. These properties of the powder may be controlled at any step in the production of the hybrid polymer related to the present invention. For example, such properties are preferably controlled by selecting a catalyst and polymerization conditions in the production of the polyolefin as a raw material, that is, the polymerization of olefin. Crystallization is an alternative preferable method for controlling the powder properties. For example, the raw material polymer which is generally in the form of particles or pellets may be crystallized beforehand to achieve good properties, and such improved polymer may be used for producing the hybrid polymer while maintaining the morphology. Alternatively, the crystallization may be performed during the preparation of the macro-initiator, and the resultant powder having good properties may be used for producing the hybrid polymer while maintaining the morphology. Still alternatively, the hybrid polymer produced by the method of the invention may be crystallized to achieve good properties. In the crystallization, the polymer is dissolved in a good solvent and thereafter a poor solvent is added or the temperature is lowered to precipitate polymer particles with controlled particle diameters and bulk density. Polymer concentration, good solvent, poor solvent, stirring rate, and temperature lowering rate are important factors in controlling the particle diameter and bulk density by crystallization. The good solvent used in the crystallization is not particularly limited as long as it can dissolve or swell the polymer, and one or more kinds of solvents can be selected depending on the type of polymer to be dissolved. It is generally preferable to use aromatic hydrocarbon-based solvents and aliphatic hydrocarbon-based solvents which have high affinity for polyolefins. Inter alia, toluene, xylene, chlorobenzene, decane and mixtures thereof are particularly preferable. When a polyolefin having a melting point higher than room temperature such as polyethylene or polypropylene is contained, it will not be dissolved at room temperature and is therefore heated in the solvent for dissolution. The polymer concentration is usually in the range of 5 g/l to 500 g/l, preferably 10 g/l to 300 g/l.

The poor solvent in the crystallization procedure is not particularly limited as long as it can cause the polymer to precipitate, and one or more kinds of solvents can be selected depending on the kind of polymer dissolved. In the crystallization, it is usually possible to reduce particle diameters by increasing the stirring rate. In addition, when the polymer is precipitated by lowering the temperature, it is generally preferable that the temperature lowering rate is reduced around a temperature at which the polymer is precipitated. The temperature lowering rate is usually 5° C./hr to 100° C./hr, preferably 5° C./hr to 50° C./hr.

Such technique for producing the hybrid polymer having good properties is particularly suited when the polyolefin segment has a melting point of 80° C. or higher, preferably 100° C. or higher.

The powdery polymer having controlled properties has an advantage that not only the solvent but also impurities such as an organic residue and a catalyst residue generated during the production can be easily removed by centrifugation or filtration. This fact is industrially advantageous as compared with polymers having nonuniform particle properties.

In the method for producing the hybrid polymer related to the present invention, the atom transfer radical polymerization proceeds while the powdery halogenated polyolefin (A') as the macro-initiator is in a non-molten state at initiation of or during the atom transfer radical polymerization.

The atom transfer radical polymerization of the present invention may be performed with or without a solvent. The solvent is not particularly limited as long as it does not inhibit the reaction. Examples include aromatic hydrocarbon-based solvents such as benzene, toluene and xylene; aliphatic hydrocarbon-based solvents such as pentane, hexane, heptane, octane, nonane and decane; alicyclic hydrocarbon-based solvents such as cyclohexane, methylcyclohexane and decahydronaphthalene; chlorinated hydrocarbon-based solvents such as chlorobenzene, dichlorobenzene, trichlorobenzene, methylene chloride, chloroform, carbon tetrachloride, and tetrachloroethylene; alcohol-based solvents such as methanol, ethanol, n-propanol, iso-propanol, n-butanol, sec-butanol, and tert-butanol; ketone-based solvents such as acetone, methyl ethyl ketone and methyl isobutyl ketone; ester-based solvents such as ethyl acetate and dimethyl phthalate; and ether-based solvents such as dimethyl ether, diethyl ether, di-n-amyl ether, tetrahydrofuran and dioxyanisole. Alternatively, water may be used as solvent. These solvents can be used alone or in combination of two or more kinds.

The reaction temperature may be arbitrary as long as the powdery halogenated polyolefin (A') as the macro-initiator does not dissolve or swell and the radical polymerization reaction takes place. The temperature may be varied depending on a desired polymerization degree of the polymer, and types and amounts of the radical polymerization initiator and solvent used. Usually, the reaction temperature is −100° C. to 250° C., preferably −50° C. to 120° C., further preferably 0° C. to 100° C. The reaction can be performed under reduced pressure or normal pressure, or under pressure depending on the case. It is preferable that the polymerization reaction is performed in an inert gas atmosphere such as nitrogen or argon.

Specifically, a powdery thermoplastic resin or thermoplastic resin composition can be produced, for example, as follows:

A powdery halogenated polyolefin (A') containing a halogen atom, an organic solvent such as toluene, and a radically polymerizable monomer such as methyl methacrylate are placed in a nitrogen-purged glass reactor. The materials are heated to 80° C. with stirring to disperse the polymer into a slurry. To this slurry solution are added copper bromide and N,N,N',N'',N'''-pentamethyldiethylenetriamine (PMDETA), and polymerization is performed at 80° C. for 1.5 hours. Methanol is added to the reaction liquid, and the polymer is filtered off and washed. The precipitated polymer is dried under reduced pressure to obtain a powdery hybrid polymer.

From the powdery hybrid polymer produced by the above method, the catalyst residue and solvent used in the polymerization, and unreacted monomers can be removed by simple filtration and washing, or by centrifugation.

<Hybrid Polymer, Thermoplastic Resin Composition Containing the Same and Uses Thereof>

The hybrid polymer related to the present invention can be used in various applications including the following:

(1) Films and Sheets

Films and sheets composed of the hybrid polymer related to the present invention are excellent in any of flexibility, transparency, stickiness, anti-fogging property, heat resistance, and releasability.

(2) Laminates Containing at Least One Layer of the Hybrid Polymer Related to the Present Invention The hybrid polymer may be used in, for example, agricultural films, wrapping films, shrink films, protecting films, separation membranes such as plasma component separation membranes and water selective permeation vaporization membranes, ion exchange membranes, battery separators, and selective separation membranes such as optical resolution membranes.

(3) Microcapsules, PTP Packages, Chemical Valves and Drug Delivery Systems (4) Modifiers The hybrid polymer may be used as a modifier for resins to control impact resistance, flowability, coating property, crystallinity, adhesion, and transparency.

The hybrid polymer may be used as a modifier for rubbers to control weather resistance, heat resistance, adhesion, and oil resistance. Examples of the rubbers include crosslinking-type rubbers such as natural rubbers (NR), isoprene rubbers (IR), butadiene rubbers (BR), styrene/butadiene rubbers (SBR), chloroprene rubbers (CR), acrylonitrile/butadiene rubbers (NBR), butyl rubbers (IIR), ethylene/propylene-based rubbers (EPM, EPDM), chlorosulfonated polyethylenes (CSM), acryl rubbers (ACM, ANM, etc.), epichlorohydrin rubbers (CO, ECO, etc.), silicone rubbers (Q), fluorine-based rubbers (FKM, etc.) and the like; and thermoplastic rubbers such as styrene rubbers, olefin rubbers, urethane rubbers, ester rubbers, amide rubbers, vinyl chloride rubbers and the like.

The hybrid polymer can be used as a modifier for lubricating oils, for example, gasoline engine oils, diesel engine oils, ship engine oils, gear oils, machinery oils, metal processing oils, motor oils, machine oils, spindle oils, and insulating oils. The hybrid polymer is also usable as a viscosity modifier or a freezing point depressant for the above oils. The hybrid polymer may be used as a modifier for waxes to control adhesion, flowability and strength. Examples of the waxes include mineral waxes such as montan wax, peat wax, ozokerite/ceresin wax, petroleum wax and the like; synthetic waxes such as polyethylene, Fischer-Tropsch wax, chemically modified hydrocarbon wax, substituted amide wax and the like; vegetable waxes, and animal waxes.

The hybrid polymer may be used as a modifier for cements to control forming property and strength. Examples of the cements include air setting cements such as lime, gypsum, magnesia cement and the like; hydraulic cements such as a roman cement, a natural cement, a Portland cement, an alumina cement, a high-sulfate slag cement and the like; and special cements such as an acid resistant cement, a refractory cement, a water glass cement, a dental cement and the like.

(5) Viscosity Modifiers and Forming Property Improvers

The hybrid polymer may be used as a viscosity modifier or forming property improver for inks such as letterpress printing inks, planographic inks, flexo inks, gravure inks and the like; and inks/paints such as oily paints, cellulose paints, synthetic resin paints, aqueous baking paints, powdery aqueous paints, Japanese lacquers and the like.

(6) Building Materials/Civil Engineering Materials

The hybrid polymer may be used as building/civil engineering resins and building/civil engineering molded articles such as floor materials, floor tiles, floor sheets, sound insulating sheets, heat insulating panels, vibration-proofing materials, decorative sheets, baseboards, asphalt modifiers, gaskets/sealing materials, roofing sheets, water-proofing sheets and the like.

(7) Automobile Interior and Exterior Materials and Gasoline Tanks

Automobile interior and exterior materials and gasoline tanks composed of the multi-branched polymer related to the present invention are excellent in rigidity, impact resistance, oil resistance, and heat resistance.

(8) The hybrid polymer may be used for electric insulating materials for electric and electronic parts; substrates for treating electronic parts; magnetic recording media, binders for magnetic recording media, sealing materials for electric circuits, home appliance materials, substrates for containers such as microwavable containers, microwavable films, polymer electrolyte substrates, electrically conductive alloy substrates; electric/electronic parts such as connectors, sockets, resistors, relay case switch coil bobbins, condensers, variable condenser cases, optical pickups, optical connectors, oscillators, various terminal plates, transformers, plugs, printed-wiring boards, tuners, speakers, microphones, headphones, small motors, magnetic head bases, power modules, housings, semiconductors, liquid crystal display parts, FDD carriages, FDD chasses, HDD parts, motor brush holders, satellite dishes, and computer-related parts; VTR parts, television parts, irons, hair dryers, rice cooker parts, microwave oven parts, acoustic parts, audio equipment parts such as audio/laser disk (registered trademark)/compact disk; home and office electric product parts such as illumination parts, refrigerator parts, air-conditioner parts, typewriter parts, and word-processor parts; office computer-related parts, telephone-related parts, facsimile-related parts, copying machine-related parts, electromagnetic shielding materials, speaker cone materials, speaker vibration elements and the like.

(9) Aqueous Emulsions

Aqueous emulsions containing the hybrid polymer related to the present invention may be used as adhesives for polyolefins excellent in heat sealability.

(10) Paint Bases

The hybrid polymer related to the present invention shows excellent dispersion stability in a solvent, and solvent dispersions containing the hybrid polymer exhibit good adhesion for bonding a metal or a polar resin and a polyolefin.

(11) Medical/Hygienic Materials

The hybrid polymer may be used for non-woven fabrics, non-woven fabric laminates, electrets, medical articles such as medical tubes, medical containers, fluid infusion bags, pre-filled syringes, and syringes, medical materials, artificial organs, artificial muscles, filtration membranes, food hygiene/health products; retort bags and freshness retaining films.

(12) General Merchandise

The hybrid polymer may be used for stationeries such as desk mats, cutting mats, rulers, axis/grip/cap of pen, grips of scissors, cutters and the like, magnetic sheets, pen cases, paper holders, binders, label seals, tapes, white boards and the like; life daily goods such as clothes, curtains, sheets, carpets, doormats, bathmats, buckets, hoses, bags, planters, filters for air-conditioner and exhaust fan, tableware, trays, cups, lunchboxes, funnel for coffee siphon, glass frames, containers, storing cases, hangers, ropes, washing nets, and the like; sport goods such as shoes, goggles, skies, rackets, balls, tents, swimming goggles, swim fins, fishing rods, cooling boxes, leisure sheets, sport nets and the like; toys such as blocks, cards, and the like; containers such as kerosene cans, drums, bottles for detergent or shampoo, and the like; and displays such as advertising displays, pylons, plastic chains, and the like.

(13) Filler Modifiers

The hybrid polymer related to the present invention can be suitably used as a filler dispersibility improver and an additive for preparing fillers having improved dispersibility.

(14) Compatibilizing Agents

The hybrid polymer related to the present invention can be used as a compatibilizing agent. By using the hybrid polymer related to the present invention, a polyolefin and a thermoplastic resin containing a polar group can be mixed at an arbitrary ratio. Since the hybrid polymer related to the present invention has the polyolefin segment and the polar polymer segment, components which are inherently incompatible can be mixed together by use of the hybrid polymer, and the elongation at break can be remarkably improved as compared with the case without using the hybrid polymer.

In the method for producing the hybrid polymer related to the present invention, the raw material halogenated polyolefin is easily obtained by reacting the industrially common polyolefin with the halogenating agent. Therefore, the method is advantageous in productivity and cost. Further, the method uses atom transfer radical polymerization which is applicable to many kinds of monomers and in which the polymerization degree is controlled relatively freely. In addition, because the polyolefin segment and the polar polymer segment are bonded together without a bonding group containing a heteroatom such as an oxygen atom or a nitrogen atom therebetween, the hybrid polymer shows high chemical stability without possibility of cleavage at heating, and hydrolysis under acidic or alkaline conditions.

EXAMPLES

The present invention will be explained more specifically below based on Examples, but the present invention is not limited to these Examples.

Each physical property in the present Examples was measured as follows.

(i) Measurement of Molecular Weight and Molecular Weight Distribution

They were measured using GPC (gel permeation chromatography) under the following conditions.

Measurement apparatus: alliance GPC2000 manufactured by Waters Corporation

Analysis apparatus: Empower Professional manufactured by Waters Corporation

Column: TSKgel GMH6HT×2+TSKgel GMH6HTL×2

Column temperature: 140° C.

Mobile phase: o-dichlorobenzene (ODCB)

Detector: differential refractometer

Flow rate: 1 mL/min

Sample concentration: 30 mg/20 ml-ODCB

Injection amount: 500 μL

Column calibration: monodisperse polystyrene (manufactured by Tosoh Corporation)

(ii) Analysis of Polymer Composition

The composition was analyzed using 1H-NMR under the following conditions.

Measurement apparatus: JNMGSX-400-type nuclear magnetic resonance apparatus manufactured by JEOL. Ltd.

Sample tube: 5 mmφ

Measuring solvent: o-dichlorobenzene-d2

Measuring temperature: 120° C.

Measuring width: 8000 Hz

Pulse width: 7.7 μs (45°)

Pulse interval: 6.0 s

Measuring times: to 8000 times (iii) Halogen Content

A sample was degraded by an oxygen flask combustion method, and the halogen content was determined by ion chromatography (DIONEX DX-500).

(iv) Powder Average Particle Diameter

The particle diameter was measured using a vibration machine (Low tap type, manufactured by Iida-seisakusho Japan Corporation) and a sieve (Iida Lasting Sieve (JIS-Z-8801), inner diameter 200 mm).

(v) Bulk specific gravity: The bulk specific gravity was measured according to JIS K-6721.

(vi) Number Average Domain Diameter

The number average domain diameter was calculated as follows. A polymer composition containing a polyolefin segment and a polar polymer segment was analyzed. In the polymer composition, either the polyolefin segment or the polar polymer segment formed an island phase. A TEM image was adjusted at such magnification that about 100 islands were visible. In the TEM image, the particle diameter of each island phase was analyzed, and an average $R_{av}$ was calculated based on the following equation (1), $$R_{av} = \Sigma R_i^3 / R_i^2 \qquad \text{Equation (1)}$$

wherein, $R_1$ is a diameter of a circle having the same area as that of each island phase.

$R_i$ can be obtained, for example, by the following method. Using Pop Imaging 3.20 (manufactured by Digital Being Kids), the TEM image is binarized. The binarized image in which the island phase is shown in white is appropriately displayed in reverse video (white on black). The binarized image in which the island phase is white is subjected to domain analysis of circular pattern, and thereby $R_i$ of each island phase can be obtained.

Production Example 1

Production of Halogenated Polyethylene

Into a sufficiently nitrogen-purged glass reactor having an internal volume of 1 L, were placed 50 g of high density polyethylene (HZ2200J manufactured by Prime Polymer Co., Ltd.) and 750 ml of chlorobenzene. The mixture was heated and stirred at 120° C. for 2 hours. Thereafter, 2 g of N-bromosuccinimide was added, followed by a reaction at 100° C. for 2 hours in a solution state. The reaction liquid was poured into 2 L of acetone, and the precipitated polymer was dried under reduced pressure to give 50.1 g of white powdery modified polyethylene. The bromine atom content in the resulting polymer was 0.83 wt % by ion chromatography analysis. Molecular weights (relative to PE) of the polymer were measured by GPC, and Mw was 103,000, Mn was 13,300, and Mw/Mn was 7.77.

Production Example 2

Production of Halogenated Polyethylene

Into a sufficiently nitrogen-purged glass reactor having an internal volume of 2 L, were placed 100 g of low density polyethylene (Myrasone 11P manufactured by DuPont-Mitsui Polychemicals Co., Ltd.) and 1500 ml of chlorobenzene, and the mixture was heated and stirred at 120° C. for 2 hours. Thereafter, 4 g of N-bromosuccinimide was added, followed by a reaction at 100° C. for 2 hours in a solution state. The reaction liquid was poured into 4 L of acetone, and the precipitated polymer was dried under reduced pressure to give 100.8 g of brown powdery modified polyethylene. The bromine atom content in the resulting polymer was 1.1 wt % by ion chromatography analysis. Molecular weights (relative to PE) of the polymer were measured by GPC, and Mw was 135,000, Mn was 16,800, and Mw/Mn was 8.00.

Production Example 3

Production of Halogenated Polyethylene

Into a sufficiently nitrogen-purged glass reactor having an internal volume of 2 L, were placed 100 g of linear low density polyethylene (NZ2540R manufactured by Prime Polymer Co., Ltd.) and 1500 ml of chlorobenzene, and the mixture was heated and stirred at 120° C. for 2 hours. Thereafter, 4 g of N-bromosuccinimide was added, followed by a reaction at 100° C. for 2 hours in a solution state. The reaction liquid was poured into 4 L of acetone, and the precipitated polymer was dried under reduced pressure to give 101.6 g of brown powdery modified polyethylene. The bromine atom content in the resulting polymer was 1.2 wt % by ion chromatography analysis. Molecular weights (relative to PE) of the polymer were measured by GPC, and Mw was 66,400, Mn was 22,900, and Mw/Mn was 2.90.

Production Example 4

Production of Halogenated Polyethylene

Into a sufficiently nitrogen-purged glass reactor having an internal volume of 1 L, were placed 50 g of terminal-unsaturated polyethylene (Mn=1,230; number of vinyl groups per 1000 carbons=9.6) and 750 ml of chlorobenzene, and the mixture was heated and stirred at 120° C. for 2 hours. Thereafter, 2 g of N-bromosuccinimide was added, followed a reaction at 100° C. for 2 hours in a solution state. The reaction liquid was poured into 2 L of acetone, and the precipitated polymer was dried under reduced pressure to give 47.9 g of brown powdery modified polyethylene. The bromine atom content in the resulting polymer was 4.4 wt % by ion chromatography analysis. Molecular weights (relative to PE) of the polymer were measured by GPC, and Mw was 2,390, Mn was 1,300, and Mw/Mn was 1.84.

Production Example 5

Production of Halogenated Polyethylene

Into a sufficiently nitrogen-purged glass reactor having an internal volume of 2 L, were placed 100 g of terminal-unsaturated polyethylene (Mn=1,230; number of vinyl groups per 1000 carbons=9.6) and 1500 ml of chlorobenzene, and the mixture was heated and stirred at 100° C. for 2 hours. Thereafter, 25 g of bromine was added, followed by a reaction at 50° C. for 5 hours in a slurry state. The reaction liquid was poured into 4 L of acetone, and the precipitated polymer was dried under reduced pressure to give 100.8 g of white powdery modified polyethylene. The bromine atom content in the resulting polymer was 11.0 wt % by ion chromatography analysis. Molecular weights (relative to PE) of the polymer were measured by GPC, and Mw was 2,660, Mn was 1,700, and Mw/Mn was 1.56.

Production Example 6

Production of Halogenated Polypropylene

Into a sufficiently nitrogen-purged glass reactor having an internal volume of 2 L, were placed 600 g of polypropylene (F102WP manufactured by Prime Polymer Co., Ltd.) and 1500 ml of chlorobenzene, and the mixture was heated and stirred at 70° C. for 2 hours. Thereafter, 20 g of N-bromosuccinimide was added, followed by a reaction at 70° C. for 2 hours in a slurry state. The reaction liquid was poured into 4 L of acetone, and the precipitated polymer was dried under reduced pressure to give 602.3 g of pale yellow powdery modified polypropylene. The bromine atom content in the resulting polymer was 0.81 wt % by ion chromatography analysis. Molecular weights (relative to PP) of the polymer were measured by GPC, and Mw was 94,300, Mn was 41,600, and Mw/Mn was 2.27.

Production Example 7

Production of Halogenated Polypropylene

Into a sufficiently nitrogen-purged glass reactor having an internal volume of 2 L, were placed 150 g of polypropylene (F102WP manufactured by Prime Polymer Co., Ltd.) and 1500 ml of chlorobenzene, and the mixture was heated and stirred at 110° C. for 2 hours. Thereafter, 5 g of N-bromosuccinimide was added, followed by a reaction at 110° C. for 2 hours in a slurry state. The reaction liquid was poured into 4 L of acetone, and the precipitated polymer was dried under reduced pressure to give 147.9 g of pale yellow powdery modified polypropylene. The bromine atom content in the resulting polymer was 0.55 wt % by ion chromatography analysis. Molecular weights (relative to PP) of the polymer were measured by GPC, and Mw was 164,000, Mn was 60,200, and Mw/Mn was 2.73.

Production Example 8

Production of Halogenated Polypropylene

Into a sufficiently nitrogen-purged glass reactor having an internal volume of 1 L, were placed 35 g of polypropylene (J106 manufactured by Prime Polymer Co., Ltd.) and 700 ml of chlorobenzene, and the mixture was heated and stirred at 100° C. for 2 hours. Thereafter, 3.67 g of N-bromosuccinimide and 339 mg of azobisisobutyronitrile were added, followed by a reaction at 120° C. for 2 hours in a solution state. The reaction liquid was poured into 2 L of acetone, and the precipitated polymer was dried under reduced pressure to give 34.7 g of pale brown powdery modified polypropylene. The bromine atom content in the resulting polymer was 1.1 wt % by ion chromatography analysis. Molecular weights (relative to PP) of the polymer were measured by GPC, and Mw was 43,500, Mn was 17,800, and Mw/Mn was 2.44.

Production Example 9

Production of Halogenated Polypropylene

Into a sufficiently nitrogen-purged glass reactor having an internal volume of 1 L, were placed 35 g of polypropylene (J106 manufactured by Prime Polymer Co., Ltd.) and 700 ml of chlorobenzene, and the mixture was heated and stirred at 120° C. for 2 hours. Thereafter, 1.25 g of N-bromosuccinimide and 115 mg of azobisisobutyronitrile were added, followed by a reaction at 100° C. for 2 hours in a solution state. The reaction liquid was poured into 2 L of acetone, and the precipitated polymer was dried under reduced pressure to give 34.6 g of pale yellow powdery modified polypropylene. The bromine atom content in the resulting polymer was 0.25 wt % by ion chromatography analysis.

Production Example 10

Production of Halogenated Polypropylene

Into a sufficiently nitrogen-purged glass reactor having an internal volume of 1 L, were placed 300 g of polypropylene (J139P manufactured by Prime Polymer Co., Ltd.) and 700 ml of chlorobenzene, and the mixture was heated and stirred at 100° C. for 2 hours. Thereafter, 10 g of N-bromosuccinimide was added, followed by a reaction at 100° C. for 2 hours in a slurry state. The reaction liquid was filtered as it was, and the polymer on the filter was washed with acetone, and dried under reduced pressure to give 297.9 g of pale yellow powdery modified polypropylene. The bromine atom content in the resulting polymer was 0.63 wt % by ion chromatography analysis. Molecular weights (relative to PP) of the polymer were measured by GPC, and Mw was 65,900, Mn was 20,300, and Mw/Mn was 3.24.

Production Example 11

Production of Halogenated Polypropylene

Into a sufficiently nitrogen-purged glass reactor having an internal volume of 1 L, were placed 300 g of polypropylene (J139P manufactured by Prime Polymer Co., Ltd.) and 700 ml of decalin, and the mixture was heated and stirred at 100° C. for 2 hours. Thereafter, 10 g of N-bromosuccinimide was added, followed by a reaction at 100° C. for 2 hours in a slurry state. The reaction liquid was filtered as it was, and the polymer on the filter was washed with acetone, and dried under reduced pressure to give 303.3 g of white powdery modified polypropylene. The bromine atom content in the resulting polymer was 0.21 wt % by ion chromatography analysis. Molecular weights (relative to PP) of the polymer were measured by GPC, and Mw was 90,500, Mn was 23,900, and Mw/Mn was 3.78.

Production Example 12

Production of Halogenated Polypropylene

Into a sufficiently nitrogen-purged glass reactor having an internal volume of 1 L, were placed 300 g of polypropylene (J139P manufactured by Prime Polymer Co., Ltd.) and 700 ml of butyl acetate, and the mixture was heated and stirred at 100° C. for 2 hours. Thereafter, 10 g of N-bromosuccinimide was added, followed by a reaction at 100° C. for 2 hours in a slurry state. The reaction liquid was filtered as it was, and the polymer on the filter was washed with acetone, and dried under reduced pressure to give 301.5 g of pale yellow powdery modified polypropylene. The bromine atom content in the resulting polymer was 0.55 wt % by ion chromatography analysis. Molecular weights (relative to PP) of the polymer were measured by GPC, and Mw was 68,800, Mn was 19,800, and Mw/Mn was 3.48.

Production Example 13

Production of Halogenated Polypropylene

Into a sufficiently nitrogen-purged glass reactor having an internal volume of 1 L, were placed 300 g of polypropylene (J139P manufactured by Prime Polymer Co., Ltd.) and 700 ml of diphenyl ether, and the mixture was heated and stirred at 100° C. for 2 hours. Thereafter, 10 g of N-bromosuccinimide was added, followed by a reaction at 100° C. for 2 hours in a slurry state. The reaction liquid was filtered as it was, and the polymer on the filter was washed with acetone, and dried under reduced pressure to give 319.5 g of pale yellow powdery modified polypropylene. The bromine atom content in the resulting polymer was 0.52 wt % by ion chromatography analysis. Molecular weights (relative to PP) of the polymer were measured by GPC, and Mw was 74,800, Mn was 20,200, and Mw/Mn was 3.70.

Production Example 14

Production of Halogenated Polypropylene

Into a sufficiently nitrogen-purged glass reactor having an internal volume of 1 L, were placed 300 g of polypropylene (J139P manufactured by Prime Polymer Co., Ltd.) and 700 ml of butyl acetate, and the mixture was heated and stirred at 100° C. for 2 hours. Thereafter, 10 g of N-bromosuccinimide was added, followed by a reaction at 100° C. for 4 hours in a slurry state. The reaction liquid was filtered as it was, and the polymer on the filter was washed with acetone, and dried under reduced pressure to give 300.4 g of pale yellow powdery modified polypropylene. The bromine atom content in the resulting polymer was 0.54 wt % by ion chromatography analysis. Molecular weights (relative to PP) of the polymer were measured by GPC, and Mw was 82,200, Mn was 21,000, and Mw/Mn was 3.92.

Production Example 15

Production of Halogenated Polypropylene

Into a sufficiently nitrogen-purged glass reactor having an internal volume of 1 L, were placed 80 g of polypropylene (J139P manufactured by Prime Polymer Co., Ltd.) and 250 ml of chlorobenzene, and the mixture was heated and stirred at 40° C. for 2 hours. Thereafter, 0.20 ml of bromine was added, followed by a reaction at 40° C. for 4 hours in a slurry state. The reaction liquid was filtered as it was, and the polymer on the filter was washed with acetone, and dried under reduced pressure to give 80.5 g of white powdery modified polypropylene. The bromine atom content in the resulting polymer was 0.25 wt % by ion chromatography analysis. Molecular weights (relative to PP) of the polymer were measured by GPC, and Mw was 123,000, Mn was 21,900, and Mw/Mn was 5.59.

Production Example 16

Production of Halogenated Polypropylene

Into a sufficiently nitrogen-purged glass reactor having an internal volume of 1 L, were placed 80 g of polypropylene (J139P manufactured by Prime Polymer Co., Ltd.) and 250 ml of butyl acetate, and the mixture was heated and stirred at 40° C. for 2 hours. Thereafter, 0.20 ml of bromine was added, followed by a reaction at 40° C. for 4 hours in a slurry state. The reaction liquid was filtered as it was, and the polymer on the filter was washed with acetone, and dried under reduced pressure to give 79.8 g of white powdery modified polypropylene. The bromine atom content in the resulting polymer was 0.25 wt % by ion chromatography analysis. Molecular weights (relative to PP) of the polymer were measured by GPC, and Mw was 120,000, Mn was 23,000, and Mw/Mn was 5.22.

Production Example 17

Production of Halogenated Polypropylene

Into a sufficiently nitrogen-purged glass reactor having 20, an internal volume of 1 L, were placed 74.7 g of terminal-unsaturated polypropylene (Mn=13,000; number of vinylidene groups per 1000 carbons=0.79) and 700 ml of 1,1,2,2-tetrachloroethane, and the mixture was heated and stirred at 105° C. for 2 hours. Thereafter, 7.89 g of N-bromosuccinimide and 727 mg of azobisisobutyronitrile were added, followed by a reaction at 105° C. for 2 hours in a solution state. The reaction liquid was poured into 2 L of acetone, and the precipitated polymer was dried under reduced pressure to give 75.4 g of pale yellow powdery modified polypropylene. The bromine atom content in the resulting polymer was 2.1 wt % by ion chromatography analysis. Molecular weights (relative to PP) of the polymer were measured by GPC, and Mw was 22,500, Mn was 10,900, and Mw/Mn was 2.07.

Production Example 18

Production of Halogenated Polypropylene

Into a sufficiently nitrogen-purged glass reactor having an internal volume of 1 L, were placed 75 g of terminal-unsaturated polypropylene (Mn=13,000; number of vinylidene groups per 1000 carbons=0.79) and 700 ml of chlorobenzene, and the mixture was heated and stirred at 120° C. for 2 hours. Thereafter, 4.75 g of N-bromosuccinimide and 438 mg of azobisisobutyronitrile were added, followed by a reaction at 100° C. for 2 hours in a solution state. The reaction liquid was poured into 2 L of acetone, and the precipitated polymer was dried under reduced pressure to give 73.1 g of pale yellow powdery modified polypropylene. The bromine atom content in the resulting polymer was 1.1 wt % by ion chromatography analysis. Molecular weights (relative to PP) of the polymer were measured by GPC, and Mw was 24,200, Mn was 12,200, and Mw/Mn was 1.98.

Production Example 19

Production of Halogenated Polypropylene

Into a sufficiently nitrogen-purged glass reactor having an internal volume of 1 L, were placed 70 g of polypropylene (S119 manufactured by Prime Polymer Co., Ltd.) and 700 ml of chlorobenzene, and the mixture was heated and stirred at 120° C. for 2 hours. Thereafter, 2.96 g of N-bromosuccinimide and 273 mg of azobisisobutyronitrile were added, followed by a reaction at 100° C. for 2 hours in a solution state. The reaction liquid was poured into 2 L of acetone, and the precipitated polymer was dried under reduced pressure to give 69.8 g of pale yellow powdery modified polypropylene. The bromine atom content in the resulting polymer was 0.60 wt % by ion chromatography analysis. Molecular weights (relative to PP) of the polymer were measured by GPC, and Mw was 81,000, Mn was 33,000, and Mw/Mn was 2.46.

Production Example 20

Production of Halogenated Polypropylene

Into a sufficiently nitrogen-purged glass reactor having an internal volume of 1 L, were placed 70 g of polypropylene (S119 manufactured by Prime Polymer Co., Ltd.) and 700 ml of chlorobenzene, and the mixture was heated and stirred at 120° C. for 2 hours. Thereafter, 2.22 g of N-bromosuccinimide and 205 mg of azobisisobutyronitrile were added, followed by a reaction at 100° C. for 2 hours in a solution state. The reaction liquid was poured into 2 L of acetone, and the precipitated polymer was dried under reduced pressure to give 69.5 g of pale yellow powdery modified polypropylene. The bromine atom content in the resulting polymer was 0.47 wt % by ion chromatography analysis. Molecular weights (relative to PP) of the polymer were measured by GPC, and Mw was 99,900, Mn was 41,200, and Mw/Mn was 2.43.

Production Example 21

Production of Halogenated Polypropylene

Into a sufficiently nitrogen-purged glass reactor having an internal volume of 2 L, were placed 150 g of polypropylene (S119 manufactured by Prime Polymer Co., Ltd.) and 1500 ml of chlorobenzene, and the mixture was heated and stirred at 120° C. for 2 hours. Thereafter, 3.71 g of N-bromosuccinimide was added, followed by a reaction at 100° C. for 2 hours in a solution state. The reaction liquid was poured into 4 L of acetone, and the precipitated polymer was dried under reduced pressure to give 148.9 g of white powdery modified polypropylene. The bromine atom content in the resulting polymer was 0.55 wt % by ion chromatography analysis.

Molecular weights (relative to PP) of the polymer were measured by GPC, and Mw was 101,000, Mn was 43,000, and Mw/Mn was 2.35.

Production Example 22

Production of Halogenated Polypropylene

Into a sufficiently nitrogen-purged glass reactor having an internal volume of 2 L, were placed 150 g of syndiotactic polypropylene ([η]=1.0) and 1500 ml of chlorobenzene, and the mixture was heated and stirred at 100° C. for 2 hours. Thereafter, 5 g of N-bromosuccinimide was added, followed by a reaction at 100° C. for 2 hours in a solution state. The reaction liquid was poured into 4 L of acetone, and the precipitated polymer was dried under reduced pressure to give 149.3 g of pale yellow powdery modified polypropylene. The bromine atom content in the resulting polymer was 0.65 wt % by ion chromatography analysis. Molecular weights (relative to PP) of the polymer were measured by GPC, and Mw was 87,000, Mn was 33,000, and Mw/Mn was 2.64.

Production Example 23

Production of Halogenated Ethylene-Propylene Copolymer (EPR)

Into a sufficiently nitrogen-purged glass reactor having an internal volume of 2 L, were placed 100 g of EPR (ethylene content=80 mol %, [η]=0.99) and 2000 ml of chlorobenzene, and the mixture was heated and stirred at 100° C. for 2 hours. Thereafter, 4 g of N-bromosuccinimide was added, followed by a reaction at 100° C. for 2 hours in a solution state. The reaction liquid was poured into 4 L of acetone, and the precipitated polymer was dried under reduced pressure to give 101.1 g of brown rubbery modified EPR. The bromine atom content in the resulting polymer was 0.55 wt % by ion chromatography analysis. Molecular weights (relative to EPR) of the polymer were measured by GPC, and Mw was 68,200, Mn was 33,100, and Mw/Mn was 2.06.

Production Example 24

Production of Halogenated EPR

Into a sufficiently nitrogen-purged glass reactor having an internal volume of 1 L, were placed 50 g of EPR (ethylene content=50 mol %, [η]=0.95) and 700 ml of chlorobenzene, and the mixture was heated and stirred at 100° C. for 2 hours. Thereafter, 1 g of N-bromosuccinimide was added, followed by a reaction at 100° C. for 2 hours in a solution state. The reaction liquid was poured into 2 L of acetone, and the precipitated polymer was dried under reduced pressure to give 49.1 g of brown rubbery modified EPR. The bromine atom content in the resulting polymer was 0.42 wt % by ion chromatography analysis.

Production Example 25

Production of Halogenated Ethylene-Butene Copolymer (EBR)

Into a sufficiently nitrogen-purged glass reactor having an internal volume of 2 L, were placed 150 g of EBR (Tafmer A0550 manufactured by Mitsui Chemicals, Inc.) and 1500 ml of chlorobenzene, and the mixture was heated and stirred at 70° C. for 2 hours. Thereafter, 5 g of N-bromosuccinimide was added, followed by a reaction at 70° C. for 2 hours in a solution state. The reaction liquid was poured into 4 L of acetone, and the precipitated polymer was dried under reduced pressure to give 146.3 g of brown rubbery modified EBR. The bromine atom content in the resulting polymer was 0.13 wt % by ion chromatography analysis. Molecular weights (relative to PS) of the polymer were measured by GPC, and Mw was 284,000, Mn was 138,000, and Mw/Mn was 2.07.

Production Example 26

Production of Halogenated Ethylene-Butene Copolymer (EBR)

Into a sufficiently nitrogen-purged glass reactor having an internal volume of 2 L, were placed 150 g of EBR (Tafmer A0550 manufactured by Mitsui Chemicals, Inc.) and 1800 ml of chlorobenzene, and the mixture was heated and stirred at 100° C. for 2 hours. Thereafter, 5 g of N-bromosuccinimide was added, followed by a reaction at 100° C. for 2 hours in a solution state. The reaction liquid was poured into 4 L of acetone, and the precipitated polymer was dried under reduced pressure to give 146.3 g of brown rubbery modified EBR. The bromine atom content in the resulting polymer was 0.58 wt % by ion chromatography analysis. Molecular weights (relative to PS) of the polymer were measured by GPC, and Mw was 185,000, Mn was 89,400, and Mw/Mn was 2.07.

Production Example 27

Production of Halogenated poly(4-methyl-1-pentene) (TPX)

Into a sufficiently nitrogen-purged glass reactor having an internal volume of 2 L, were placed 150 g of TPX (MX004 manufactured by Mitsui Chemicals, Inc.) and 1500 ml of chlorobenzene, and the mixture was heated and stirred at 120° C. for 2 hours. Thereafter, 5 g of N-bromosuccinimide was added, followed by a reaction at 110° C. for 2 hours in a solution state. The reaction liquid was poured into 4 L of acetone, and the precipitated polymer was dried under reduced pressure to give 139.1 g of pale brown powdery modified TPX. The bromine atom content in the resulting polymer was 0.58 wt % by ion chromatography analysis. Molecular weights (relative to PS) of the polymer were measured by GPC, and Mw was 415,000, Mn was 100,000, and Mw/Mn was 4.13.

Production Example 28

Production of Halogenated Ethylene-Cyclic Olefin Copolymer (COC)

Into a sufficiently nitrogen-purged glass reactor having an internal volume of 2 L, were placed 100 g of COC (APEL6015T manufactured by Mitsui Chemicals, Inc.) and 2000 ml of chlorobenzene, and the mixture was heated and stirred at 120° C. for 2 hours. Thereafter, 4 g of N-bromosuccinimide was added, followed by a reaction at 100° C. for 2 hours in a solution state. The reaction liquid was poured into 4 L of acetone, and the precipitated polymer was dried under reduced pressure to give 97.7 g of pale brown powdery modified COC. The bromine atom content in the resulting polymer was 0.52 wt % by ion chromatography analysis. Molecular weights (relative to PS) of the polymer were measured by GPC, and Mw was 105,000, Mn was 43,500, and Mw/Mn was 2.41.

Production Example 29

Production of Halogenated Ethylene-Ethyl Acrylate Copolymer (EEA)

Into a sufficiently nitrogen-purged glass reactor having an internal volume of 1 L, were placed 74.2 g of EEA (A701 manufactured by DuPont-Mitsui Polychemicals Co., Ltd.) and 700 ml of chlorobenzene, and the mixture was heated and stirred at 100° C. for 2 hours. Thereafter, 5.95 g of N-bromosuccinimide and 548 mg of azobisisobutyronitrile were added, followed by a reaction at 100° C. for 2 hours in a solution state. The reaction liquid was poured into 2 L of acetone, and the precipitated polymer was dried under reduced pressure to give 74.9 g of dark brown rubbery modified EEA. The bromine atom content in the resulting polymer was 1.7 wt % by ion chromatography analysis. Molecular weights (relative to PE) of the polymer were measured by GPC, and Mw was 97,700, Mn was 17,000, and Mw/Mn was 5.74.

Production Example 30

Production of Halogenated Ethylene-Methacrylic Acid Copolymer

Into a sufficiently nitrogen-purged glass reactor having an internal volume of 1 L, were placed 75 g of an ethylene-methacrylic acid copolymer (Nucrel N1207C manufactured by DuPont-Mitsui Polychemicals Co., Ltd.) and 700 ml of chlorobenzene, and the mixture was heated and stirred at 100° C. for 2 hours. Thereafter, 3.72 g of N-bromosuccinimide was added, followed by a reaction at 100° C. for 2 hours in a solution state. The reaction liquid was poured into 2 L of acetone, and the precipitated polymer was dried under reduced pressure to give 74.8 g of dark brown rubbery modified polymer. The bromine atom content in the resulting polymer was 0.97 wt % by ion chromatography analysis.

Production Example 31

Production of Halogenated Maleinized Polypropylene

Into a sufficiently nitrogen-purged glass reactor having an internal volume of 1 L, were placed 75.2 g of maleic anhydride-modified polypropylene ($[\eta]$=0.94; content of acid anhydride group derived from maleic anhydride was 0.57 wt %) and 700 ml of chlorobenzene, and the mixture was heated and stirred at 100° C. for 2 hours. Thereafter, 3.72 g of N-bromosuccinimide and 344 mg of azobisisobutyronitrile were added, followed by a reaction at 100° C. for 2 hours in a solution state. The reaction liquid was poured into 2 L of acetone, and the precipitated polymer was dried under reduced pressure to give 75.4 g of white powdery modified polypropylene. The acid anhydride group content in the resulting polymer was 0.55 wt % by IR analysis, and the bromine atom content was 0.76 wt % by ion chromatography analysis. Molecular weights (relative to PP) of the polymer were measured by GPC, and Mw was 45,700, Mn was 21,100, and Mw/Mn was 2.17.

Production Example 32

Production of Halogenated Maleinized COC

Into a sufficiently nitrogen-purged glass reactor having an internal volume of 500 ml, were placed 30 g of maleic anhydride-modified COC (content of acid anhydride group derived from maleic anhydride was 0.8 wt %) obtained by modifying COC (APEL 6015T manufactured by Mitsui Chemicals, Inc.) with maleic anhydride, and 300 ml of chlorobenzene. The mixture was heated and stirred at 30° C. for 2 hours. Thereafter, 0.15 ml of bromine was added, followed by a reaction at 30° C. for 2 hours in a solution state. The reaction liquid was poured into 2 L of acetone, and the precipitated polymer was dried under reduced pressure to give 30.1 g of brown powdery modified COC. The acid anhydride group content in the resulting polymer was 0.78 wt % by IR analysis, and the bromine atom content was 0.30 wt % by ion chromatography analysis.

Production Example 33

Production of Halogenated Maleinized EBR

Into a sufficiently nitrogen-purged glass reactor having an internal volume of 1 L, were placed 76 g of maleic anhydride-modified EBR (content of butene was 20 wt %, content of acid anhydride group derived from maleic anhydride was 0.5 wt %) and 700 ml of chlorobenzene, and the mixture was heated and stirred at 100° C. for 2 hours. Thereafter, 3.38 g of N-bromosuccinimide, and 0.31 g of azobisisobutyronitrile were added, followed by a reaction at 100° C. for 2 hours. The reaction liquid was poured into 2 L of acetone, and the precipitated polymer was dried under reduced pressure to give 75 g of rubbery modified EBR. The acid anhydride group content in the resulting polymer was 0.48 wt % by IR analysis, and the bromine atom content was 0.97 wt % by ion chromatography analysis. Molecular weights of the polymer (relative to PS) were measured by GPC, and Mw was 92,900, Mn was 44,400, and Mw/Mn was 2.09.

Production Example 34

Production of Powdery Halogenated Polypropylene

Into a sufficiently nitrogen-purged glass reactor having an internal volume of 1 L, were placed 150 g of polypropylene (J139P manufactured by Prime Polymer Co., Ltd.) and 1500 ml of chlorobenzene, and the mixture was heated and stirred at 105° C. for 2 hours. Thereafter, 10 g of N-bromosuccinimide was added, followed by a reaction at 105° C. for 2 hours in a slurry state. The reaction liquid was filtered as it was, and the polymer on the filter was washed with acetone, and dried under reduced pressure to give 149.4 g of pale yellow powdery modified polypropylene. The bromine atom content in the resulting polymer was 1.1 wt % by ion chromatography analysis. Molecular weights of the polymer (relative to PP) were measured by GPC, and Mw was 48,700, Mn was 19,600, and Mw/Mn was 2.48. The powder had a bulk density of 0.30 g/ml, and an average particle diameter of 220 μm.

Production Example 35

Production of Halogenated Polypropylene

Into a sufficiently nitrogen-purged glass reactor having an internal volume of 1 L, were placed 30.0 g of maleic anhydride-modified polypropylene ([η]=0.94, content of acid anhydride group derived from maleic anhydride was 0.57 wt %) and 200 ml of dichlorobenzene, and the mixture was heated to 70° C. Thereafter, 0.12 ml of anhydrous bromine and 0.10 ml of phosphorus tribromide were added, followed by a reaction at 70° C. for 4 hours. When bromine was consumed and the pale brown color of the reaction liquid became fainter, the solution was cooled to room temperature, and filtered with a Kiriyama funnel. The polymer on the filter was rinsed with methanol three times. The resulting polymer was dried under reduced pressure to give white powdery modified polypropylene. The acid anhydride group content in the resulting polymer was 0.55 wt % by IR analysis.

Production Example 36

Production of Halogenated Polypropylene

Into a sufficiently nitrogen-purged glass reactor having an internal volume of 1 L, were placed 35 g of polypropylene (Mw=128000) and 700 ml of chlorobenzene, and the mixture was heated and stirred at 120° C. for 2 hours. Thereafter, 1.5 g of N-bromosuccinimide, and 137 mg of azobisisobutyronitrile were added, followed by a reaction at 100° C. for 2 hours. The reaction liquid was poured into 2 L of acetone, and the precipitated polymer was dried under reduced pressure to give 34 g of pale brown powdery modified polypropylene. The bromine atom content in the resulting polymer was 0.44 wt % by ion chromatography analysis. In addition, 1H NMR analysis showed a signal based on a carbon-carbon double bond at δ 4.75 to 5.8 ppm, and a signal based on a bromomethylene group and a bromomethine group at an allyl position at δ 3.6 to 4.5 ppm. From a compositional ratio calculated from NMR data, and a value of Mn obtained by GPC analysis, the halogenated polypropylene was shown to contain 1.2 bromine atoms on average introduced in the molecular chain.

Production Example 37

Production of Halogenated Polypropylene

Into a sufficiently nitrogen-purged glass reactor having an internal volume of 1 L, were placed 35 g of polypropylene ([η]=1.20 dl/g) and 700 ml of chlorobenzene, and the mixture was heated and stirred at 120° C. for 2 hours. Thereafter, 0.74 g of N-bromosuccinimide and 68 mg of azobisisobutyronitrile were added, followed by a reaction at 100° C. for 2 hours. The reaction liquid was poured into 2 L of acetone, and the precipitated polymer was dried under reduced pressure to give 34.5 g of white powdery modified polypropylene. The bromine atom content in the resulting polymer was 0.21 wt % by ion chromatography analysis. In addition, 1H NMR analysis showed a signal based on a carbon-carbon double bond at δ 4.75 to 5.8 ppm, and a signal based on a bromomethylene group and a bromomethine group at an allyl position at δ 3.6 to 4.5 ppm. From the integrated values of these, the content of carbon-carbon double bond was 0.24 mole %, and the content of bromomethylene group and bromomethine group at an allyl position was 0.10 mole %.

Production Example 38

Production of Halogenated Polypropylene

Into a sufficiently nitrogen-purged glass reactor having an internal volume of 1 L, were placed 35 g of polypropylene ([η]=1.65 dl/g) and 700 ml of chlorobenzene, and the mixture was heated and stirred at 120° C. for 2 hours. Thereafter, 1.25 g of N-bromosuccinimide was added, followed by a reaction at 100° C. for 2 hours. The reaction liquid was poured into 2 L of acetone, and the precipitated polymer was dried under reduced pressure to give 34.8 g of pale brown powdery modified polypropylene. The bromine atom content in the resulting polymer was 0.54 wt % by ion chromatography analysis. In addition, 1H NMR analysis showed a signal based on a carbon-carbon double bond at δ 4.75 to 5.8 ppm, and a signal based on a bromomethylene group and a bromomethine group at an allyl position at δ 3.6 to 4.5 ppm. From the integrated values of these, the content of carbon-carbon double bond was 0.62 mole %, and the content of bromomethylene-group and bromomethine group at an allyl position was 0.22 mole %.

Production Example 39

Production of Halogenated Polypropylene

Pale brown powdery modified polypropylene was obtained in an amount of 35 g in the same manner as that of Production Example 38 except that N-bromosuccinimide was used in an amount of 3.72 g. The bromine atom content in the resulting polymer was 2.2 wt % by ion chromatography analysis. In addition, 1H NMR analysis showed a signal based on a carbon-carbon double bond at 64.75 to 5.8 ppm, and a signal based on a bromomethylene group and a bromomethine group at an allyl position at δ 3.6 to 4.5 ppm. From the integrated values of these, the content of carbon-carbon double bond was 1.5 mole %, and the content of bromomethylene group and bromomethine group at an allyl position was 0.63 mole %.

Production Example 40

Production of Powdery Halogenated Polypropylene

Into a sufficiently nitrogen-purged glass reactor having an internal volume of 2 L, were placed 50 g of polypropylene (S119 manufactured by Prime Polymer Co., Ltd.) and 2000 ml of chlorobenzene, and the mixture was heated and stirred at 120° C. for 2 hours. Thereafter, the temperature was lowered to 70° C. over 5 hours under stirring at a rotation speed of 600 rpm, to precipitate polypropylene. To this slurry was added 2 g of N-bromosuccinimide, followed by a reaction at 70° C. for 2 hours in a slurry state. The reaction liquid was poured into 4 L of acetone, and the precipitated polymer was dried under reduced pressure to give 49.0 g of white powdery modified polypropylene. The bromine atom content in the resulting polymer was 0.25 wt % by ion chromatography analysis. Molecular weights of the polymer (relative to PP) were measured by GPC, and Mw was 165,000, Mn was 52,900, and Mw/Mn was 3.11. The powder had a bulk density of 0.15 g/ml and an average particle diameter of 40 μm.

Example 1

Synthesis of Polyethylene-Polymethyl Methacrylate (PE-PMMA) Hybrid Polymer

Into a sufficiently nitrogen-purged glass reactor having an internal volume of 500 ml, were placed 20 g of the halogenated polyethylene obtained in [Production Example 1], 233.1 ml of xylene, and 66.9 ml of methyl methacrylate (MMA), and the mixture was heated and stirred at 100° C. to dissolve them. To this solution were added 287 mg of copper (I) bromide, and 0.84 ml of N,N,N',N'',N''-pentamethyldiethylenetriamine (PMDETA) followed by polymerization at 100° C. for 4 hours. The reaction liquid was poured into 1.5 L of methanol, and the precipitated polymer was dried under reduced pressure to give 22.72 g of a solid polymer. 3.02 g of the resulting polymer was taken, and Soxhlet extraction was performed for 9 hours under reflux using 150 ml of acetone. The extraction residue was dried under reduced pressure to give 2.94 g of a polymer. 1H-NMR analysis of the extracted sample showed that the compositional ratio PE/PMMA was 90/10 (wt %).

Example 2

Synthesis of PE-PMMA Hybrid Polymer

Into a sufficiently nitrogen-purged glass reactor having an internal volume of 500 ml, were placed 20 g of the halogenated polyethylene obtained in [Production Example 2], 233.1 ml of xylene, and 66.9 ml of MMA, and the mixture was heated and stirred at 100° C. to dissolve them. To this solution were added 287 mg of copper (I) bromide, and 0.84 ml of PMDETA, followed by polymerization at 100° C. for 4 hours. The reaction liquid was poured into 1.5 L of methanol, and the precipitated polymer was dried under reduced pressure to give 24.49 g of a solid polymer. 5.00 g of the resulting polymer was taken, and Soxhlet extraction was performed for 9 hours under reflux using 150 ml of acetone. The extraction residue was dried under reduced pressure to give 4.83 g of a polymer. 1H-NMR analysis of the extracted sample showed that the compositional ratio PE/PMMA was 84/16 (wt %).

Example 3

Synthesis of PE-PMMA Hybrid Polymer

Into a sufficiently nitrogen-purged glass reactor having an internal volume of 500 ml, were placed 20 g of the halogenated polyethylene obtained in [Production Example 3], 233.1 ml of xylene and 66.9 ml of MMA, and the mixture was heated and stirred at 100° C. to dissolve them. To this solution were added 287 mg of copper (I) bromide, and 0.84 ml of PMDETA, followed by polymerization at 100° C. for 4 hours. The reaction liquid was poured into 1.5 L of methanol, and the precipitated polymer was dried under reduced pressure to give 22.78 g of a solid polymer. 4.73 g of the resulting polymer was taken, and Soxhlet extraction was performed for 9 hours under reflux using 150 ml of acetone. The extraction residue was dried under reduced pressure to give 4.57 g of a polymer. 1H-NMR analysis of the extracted sample showed that the compositional ratio PE/PMMA was 91/9 (wt %).

Example 4

Synthesis of PE-PMMA Hybrid Polymer

Into a sufficiently nitrogen-purged glass reactor having an internal volume of 500 ml, were placed 20 g of the halogenated polyethylene obtained in [Production Example 4], 233.1 ml of xylene, and 66.9 ml of MMA, and the mixture was heated and stirred at 100° C. to dissolve them. To this solution were added 287 mg of copper (I) bromide, and 0.84 ml of PMDETA, followed by polymerization at 100° C. for 4 hours. The reaction liquid was poured into 1.5 L of methanol, and the precipitated polymer was dried under reduced pressure to give 21.88 g of a solid polymer. 5.00 g of the resulting polymer was taken, and Soxhlet extraction was performed for 9 hours under reflux using 150 ml of acetone. The extraction residue was dried under reduced pressure to give 4.69 g of a polymer. 1H-NMR analysis of the extracted sample showed that the compositional ratio PE/PMMA was 97/3 (wt %).

Example 5

Synthesis of PE-PMMA Hybrid Polymer

Into a sufficiently nitrogen-purged glass reactor having an internal volume of 500 ml, were placed 20 g of the halogenated polyethylene obtained in [Production Example 4], 233.1 ml of xylene, and 66.9 ml of MMA, and the mixture was heated and stirred at 100° C. to dissolve them. To this solution were added 287 mg of copper (I) bromide, and 0.84 ml of PMDETA, followed by polymerization at 100° C. for 4 hours. The reaction liquid was poured into 1.5 L of methanol, and the precipitated polymer was dried under reduced pressure to give 25.36 g of a solid polymer. 4.95 g of the resulting polymer was taken, and Soxhlet extraction was performed for 9 hours under reflux using 150 ml of acetone. The extraction residue was dried under reduced pressure to give 4.43 g of a polymer. 1H-NMR analysis of the extracted sample showed that the compositional ratio PE/PMMA was 88/12 (wt %).

Example 6

Synthesis of Polypropylene-Polymethyl Methacrylate (PP-PMMA) Hybrid Polymer

Into a sufficiently nitrogen-purged glass reactor having an internal volume of 500 ml, were placed 150 g of the halogenated polypropylene obtained in [Production Example 6] and 500 ml of MMA, and the mixture was heated and stirred at 80° C. To this slurry were added 392 mg of copper (I) bromide, and 1.14 ml of PMDETA, followed by polymerization at 80° C. for 3 hours. The reaction liquid was poured into 4 L of methanol, and the precipitated polymer was dried under reduced pressure to give 215.3 g of a solid polymer. 1H-NMR analysis showed that the compositional ratio PP/PMMA was 70/30 (wt %).

Example 7

Synthesis of PP-PMMA Hybrid Polymer

Into a sufficiently nitrogen-purged glass reactor having an internal volume of 500 ml, were placed 25 g of the halogenated polypropylene obtained in [Production Example 6], 326 ml of xylene, and 48.7 ml of MMA, and the mixture was heated and stirred at 110° C. to dissolve them. To this solution were added 326 mg of copper (I) bromide, and 0.95 ml of PMDETA, followed by polymerization at 110° C. for 10 minutes. The reaction liquid was poured into 1.5 L of methanol, and the precipitated polymer was dried under reduced pressure to give 36.3 g of a solid polymer. 1H-NMR analysis showed that the compositional ratio PP/PMMA was 69/31 (wt %).

Example 8

Synthesis of PP-PMMA Hybrid Polymer

Into a sufficiently nitrogen-purged glass reactor having an internal volume of 500 ml, were placed 60 g of the halogenated polypropylene obtained in [Production Example 6], and 200 ml of MMA, and the mixture was heated and stirred at 90° C. To this slurry were added 94.2 mg of iron (II) bromide, and 0.22 ml of tri(n-butyl)phosphine, followed by polymerization at 90° C. for 50 minutes. The reaction liquid was poured into 4 L of methanol, and the precipitated polymer was dried under reduced pressure to give 82.0 g of a solid polymer. 1H-NMR analysis showed that the compositional ratio PP/PMMA was 73/27 (wt %).

Example 9

Synthesis of PP-Styrene/Acrylonitrile Copolymer (AS) Hybrid Polymer

Into a sufficiently nitrogen-purged glass reactor having an internal volume of 500 ml, were placed 25 g of the halogenated polypropylene obtained in [Production Example 6], 80 ml of xylene, 145.5 ml of styrene (St), and 36.2 ml of acrylonitrile (AN), and the mixture was heated and stirred at 110° C. to dissolve them. To this solution were added 326 mg of copper (I) bromide, and 0.95 ml of PMDETA, followed by polymerization at 110° C. for 40 minutes. The reaction liquid was poured into 1.5 L of methanol, and the precipitated polymer was dried under reduced pressure to give 30.1 g of a solid polymer. 1H-NMR analysis showed that the compositional ratio PP/AS was 83/17 (wt %).

Example 10

Synthesis of PP-poly-n-butyl Acrylate (PnBA) Hybrid Polymer

Into a sufficiently nitrogen-purged glass reactor having an internal volume of 500 ml, were placed 60 g of the halogenated polypropylene obtained in [Production Example 6], and 200 ml of n-butyl acrylate (nBA), and the mixture was heated and stirred at 90° C. To this slurry were added 94.2 mg of iron (II) bromide, and 0.22 ml of tri(n-butyl)phosphine, followed by polymerization at 90° C. for 4 hours. The reaction liquid was poured into 4 L of methanol, and the precipitated polymer was dried under reduced pressure to give 68.5 g of a solid polymer. 1H-NMR analysis showed that the compositional ratio PP/PnBA was 88/12 (wt %).

Example 11

Synthesis of PP-AS Hybrid Polymer

Into a sufficiently nitrogen-purged glass reactor having an internal volume of 500 ml, were placed 25 g of the halogenated polypropylene obtained in [Production Example 7], 194.8 ml of St, and 48.1 ml of AN, and the mixture was heated and stirred at 85° C. To this slurry were added 258 mg of copper (I) bromide, and 0.75 ml of PMDETA, followed by polymerization at 85° C. for 4 hours. The reaction liquid was poured into 1.5 L of methanol, and the precipitated polymer was dried under reduced pressure to give 43.0 g of a solid polymer. 1H-NMR analysis showed that the compositional ratio PP/AS was 58/42 (wt %).

Example 12

Synthesis of PP-AS Hybrid Polymer

Into a sufficiently nitrogen-purged glass reactor having an internal volume of 500 ml, were placed 15 g of the halogenated polypropylene obtained in [Production Example 7], 120 ml of St, 30 ml of AN, and 26 ml of toluene, and the mixture was heated and stirred at 80° C. To this slurry was added 4.6 mg of cyclopentadienyl iron (I) dicarbonyl dimer, followed by polymerization at 80° C. for 4 hours. The reaction liquid was poured into 1.5 L of methanol, and the precipitated polymer was dried under reduced pressure to give 24.9 g of a solid polymer. 1H-NMR analysis showed that the compositional ratio PP/AS was 60/40 (wt %).

Example 13

Synthesis of PP-AS Hybrid Polymer

Into a sufficiently nitrogen-purged glass reactor having an internal volume of 500 ml, were placed 15 g of the halogenated polypropylene obtained in [Production Example 7], 120 ml of St, 30 ml of AN, and 26 ml of toluene, and the mixture was stirred at 25° C. To this slurry were added 189 mg of copper (I) bromide, and 0.55 ml of PMDETA, followed by polymerization at 80° C. for 4 hours. The reaction liquid was poured into 1.5 L methanol, and the precipitated polymer was dried under reduced pressure to give 19.2 g of a solid polymer. 1H-NMR analysis showed that the compositional ratio PP/AS was 78/22 (wt %). 5.07 g of the resulting polymer was taken, and Soxhlet extraction was performed for 9 hours under reflux using 150 ml of acetone. The extraction residue was dried under reduced pressure to give 5.02 g of a polymer. 1H-NMR analysis of the extracted sample showed that the compositional ratio PP/AS was 79/21 (wt %).

Example 14

Synthesis of PP-AS Hybrid Polymer

Into a sufficiently nitrogen-purged glass reactor having an internal volume of 500 ml, were placed 10 g of the halogenated polypropylene obtained in [Production Example 8], 200 ml of xylene, 27.5 ml of St, and 10.5 ml of AN, and the mixture was heated and stirred at 100° C. to dissolve them. To this solution were added 574 mg of copper (I) bromide, and 1.67 ml of PMDETA, followed by polymerization at 100° C. for 4 hours. The reaction liquid was poured into 1.5 L of methanol, and the precipitated polymer was dried under reduced pressure to give 15.3 g of a solid polymer. 1H-NMR analysis showed that the compositional ratio PP/AS was 65/35 (wt %).

Example 15

Synthesis of PP-PMMA Hybrid Polymer

Into a sufficiently nitrogen-purged glass reactor having an internal volume of 500 ml, were placed 15 g of the halogenated polypropylene obtained in [Production Example 9], 65 ml of xylene, and 25.1 ml of MMA, and the mixture was heated and stirred at 100° C. to dissolve them. To this solution were added 168 mg of copper (I) bromide, and 0.49 ml of PMDETA, followed by polymerization at 100° C. for 4 hours. The reaction liquid was poured into 1.5 L of methanol, and the precipitated polymer was dried under reduced pressure to give 23.3 g of a solid polymer. 1H-NMR analysis showed that the compositional ratio PP/PMMA was 64/36 (wt %).

Example 16

Synthesis of PP-AS Hybrid Polymer

Into a sufficiently nitrogen-purged glass reactor having an internal volume of 500 ml, were placed 25 g of the halogenated polypropylene obtained in [Production Example 10], 194.4 ml of St, and 48.0 ml of AN, and the mixture was stirred at 25° C. To this slurry were added 258 mg of copper (I) bromide, and 0.75 ml of PMDETA, followed by polymerization at 85° C. for 4 hours. The reaction liquid was poured into 1.5 L of methanol, and the precipitated polymer was dried under reduced pressure to give 31.0 g of a solid polymer. 1H-NMR analysis showed that the compositional ratio PP/AS was 80/20 (wt %). 4.69 g of the resulting polymer was taken, and Soxhlet extraction was performed for 9 hours under reflux using 150 ml of acetone. The extraction residue was dried under reduced pressure to give 4.67 g of a polymer. 1H-NMR analysis of the extracted sample showed that the compositional ratio PP/AS was 81/19 (wt %).

Example 17

Synthesis of PP-AS Hybrid Polymer

A solid polymer was obtained in an amount of 28.0 g in the same manner as that of Example 16 except that the halogenated polypropylene was replaced by the halogenated polypropylene obtained in [Production Example 11]. 1H-NMR analysis showed that the compositional ratio PP/AS was 89/11 (wt %). 4.74 g of the resulting polymer was taken, and Soxhlet extraction was performed for 9 hours under reflux using 150 ml of acetone. The extraction residue was dried under reduced pressure to give 4.69 g of a polymer. 1H-NMR analysis of the extracted sample showed that the compositional ratio PP/AS was 90/10 (wt %).

Example 18

Synthesis of PP-AS Hybrid Polymer

A solid polymer was obtained in an amount of 34.2 g in the same manner as that of Example 16 except that the halogenated polypropylene was replaced by the halogenated polypropylene obtained in [Production Example 12]. 1H-NMR analysis showed that the compositional ratio PP/AS was 73/27 (wt %). 4.76 g of the resulting polymer was taken, and Soxhlet extraction was performed for 9 hours under reflux using 150 ml of acetone. The extraction residue was dried under reduced pressure to give 4.73 g of a polymer. 1H-NMR analysis of the extracted sample showed that the compositional ratio PP/AS was 74/26 (wt %).

Example 19

Synthesis of PP-AS Hybrid Polymer

Into a sufficiently nitrogen-purged glass reactor having an internal volume of 500 ml, were placed 25 g of the halogenated polypropylene obtained in [Production Example 12], 194.4 ml of St, and 48.0 ml of AN, and the mixture was stirred at 25° C. To this slurry were added 201 mg of copper (II) bromide, 0.19 ml of PMDETA, and 0.29 ml of tin 2-ethylhexanoate, followed by polymerization at 85° C. for 4 hours. The reaction liquid was poured into 1.5 L of methanol, and the precipitated polymer was dried under reduced pressure to give 29.3 g of a solid polymer. 1H-NMR analysis showed that the compositional ratio PP/AS was 85/15 (wt %).

Example 20

Synthesis of PP-AS Hybrid Polymer

A solid polymer was obtained in an amount of 30.3 g in the same manner as that of Example 16 except that the halogenated polypropylene was replaced by the halogenated polypropylene obtained in [Production Example 13]. 1H-NMR analysis showed that the compositional ratio PP/AS was 83/17 (wt %). 4.70 g of the resulting polymer was taken, and Soxhlet extraction was performed for 9 hours under reflux using 150 ml of acetone. The extraction residue was dried under reduced pressure to give 4.66 g of a polymer. 1H-NMR analysis of the extracted sample showed that the compositional ratio PP/AS was 83/17 (wt %).

Example 21

Synthesis of PP-AS Hybrid Polymer

Into a sufficiently nitrogen-purged glass reactor having an internal volume of 500 ml, were placed 25 g of the halogenated polypropylene obtained in [Production Example 14], 120 ml of anisole, 97.5 ml of St, and 24.0 ml of AN, and the mixture was stirred at 25° C. To this slurry were added 258 mg of copper (I) bromide, and 0.75 ml of PMDETA, followed by polymerization at 100° C. for 4 hours. The reaction liquid was poured into 1.5 L of methanol, and the precipitated polymer was dried under reduced pressure to give 31.9 g of a solid polymer. 1H-NMR analysis showed that the compositional ratio PP/AS was 78/22 (wt %).

Example 22

Synthesis of PP-AS Hybrid Polymer

A solid polymer was obtained in an amount of 29.2 g in the same manner as that of Example 21 except that 120 ml of butyl acetate was used in place of anisole. 1H-NMR analysis showed that the compositional ratio PP/AS was 86/14 (wt %).

Example 23

Synthesis of PP-AS Hybrid Polymer

Into a sufficiently nitrogen-purged glass reactor having an internal volume of 500 ml, were placed 35 g of the halogenated polypropylene obtained in [Production Example 15], 168 ml of St, and 41 ml of AN, and the mixture was stirred at 25° C. To this slurry were added 301 mg of copper (I) bromide, and 0.88 ml of PMDETA, followed by polymerization at 100° C. for 5 hours. The reaction liquid was poured into 1.5 L of methanol, and the precipitated polymer was dried under reduced pressure to give 47.6 g of a solid polymer. 1H-NMR analysis showed that the compositional ratio PP/AS was 73/27 (wt %).

Example 24

Synthesis of PP-AS Hybrid Polymer

A solid polymer was obtained in an amount of 50.0 g in the same manner as that of Example 23 except that the halogenated polypropylene was replaced by the halogenated polypropylene obtained in [Production Example 16]. 1H-NMR analysis showed that the compositional ratio PP/AS was 70/30 (wt %).

Example 25

Synthesis of PP-AS Hybrid Polymer

Into a sufficiently nitrogen-purged glass reactor having an internal volume of 500 ml, were placed 12.6 g of the halogenated polypropylene obtained in [Production Example 17], 34.4 ml of xylene, 33 ml of St, and 12.6 ml of AN, and the mixture was heated and stirred at 90° C. to dissolve them. To this solution were added 287 mg of copper (I) bromide, and 0.84 ml of PMDETA, followed by polymerization at 90° C. for 6 hours. The reaction liquid was poured into 1.5 L of methanol, and the precipitated polymer was dried under reduced pressure to give 14.6 g of a solid polymer. 1H-NMR analysis showed that the compositional ratio PP/AS was 86/14 (wt %).

Example 26

Synthesis of PP-Polydodecyl Methacrylate (PDMA) Hybrid Polymer

Into a sufficiently nitrogen-purged glass reactor having an internal volume of 500 ml, were placed 12.6 g of the halogenated polypropylene obtained in [Production Example 17], 57 ml of xylene, and 23.5 ml of dodecyl methacrylate (DMA), and the mixture was heated and stirred at 100° C. to dissolve them. To this solution were added 287 mg of copper (I) bromide, and 0.84 ml of PMDETA, followed by polymerization at 100° C. for 4 hours. The reaction liquid was poured into 1.5 L of methanol, and the precipitated polymer was dried under reduced pressure to give 28.6 g of a solid polymer. 1H-NMR analysis showed that the compositional ratio PP/PDMA was 44/56 (wt %).

Example 27

Synthesis of PP-PMMA Hybrid Polymer

Into a sufficiently nitrogen-purged glass reactor having an internal volume of 500 ml, were placed 12.6 g of the halogenated polypropylene obtained in [Production Example 17], 62.9 ml of xylene, and 17.1 ml of MMA, and the mixture was heated and stirred at 90° C. to dissolve them. To this solution were added 287 mg of copper (I) bromide, and 0.84 ml of PMDETA, followed by polymerization at 90° C. for 6 hours. The reaction liquid was poured into 1.5 L of methanol, and the precipitated polymer was dried under reduced pressure to give 23.9 g of a solid polymer. 1H-NMR analysis showed that the compositional ratio PP/PMMA was 53/47 (wt %).

Example 28

Synthesis of PP-Polystyrene (PS) Hybrid Polymer

Into a sufficiently nitrogen-purged glass reactor having an internal volume of 500 ml, were placed 10 g of the halogenated polypropylene obtained in [Production Example 18], 100 ml of xylene, and 27.2 ml of St, and the mixture was heated and stirred at 100° C. to dissolve them. To this solution were added 425 mg of copper (I) bromide, and 1.24 ml of PMDETA, followed by polymerization at 100° C. for 4 hours. The reaction liquid was poured into 1 L of methanol, and the precipitated polymer was dried under reduced pressure to give 14.5 g of a solid polymer. 1H-NMR analysis showed that the compositional ratio PP/PS was 67/33 (wt %).

Example 29

Synthesis of PP-AS Hybrid Polymer

Into a sufficiently nitrogen-purged glass reactor having an internal volume of 500 ml, were placed 21.8 g of the halogenated polypropylene obtained in [Production Example 19], 126 ml of xylene, 82.5 ml of St, and 31.6 ml of AN, and the mixture was heated and stirred at 100° C. to dissolved them. To this solution were added 430 mg of copper (I) bromide, and 1.25 ml of PMDETA, followed by polymerization at 100° C. for 4 hours. The reaction liquid was poured into 1.5 L of methanol, and the precipitated polymer was dried under reduced pressure to give 29.8 g of a solid polymer. 1H-NMR analysis showed that the compositional ratio PP/AS was 73/27 (wt %).

Example 30

Synthesis of PP-AS Hybrid Polymer

Into a sufficiently nitrogen-purged glass reactor having an internal volume of 500 ml, were placed 25 g of the halogenated polypropylene obtained in [Production Example 20], 170.8 ml of St, and 42.1 ml of AN, and the mixture was heated and stirred at 110° C. to dissolve them. To this solution were added 387 mg of copper (I) bromide, and 1.11 ml of PMDETA, followed by polymerization at 110° C. for 4 hours. The reaction liquid was poured into 1.5 L of methanol, and the precipitated polymer was dried under reduced pressure to give 63.0 g of a solid polymer. 1H-NMR analysis showed that the compositional ratio PP/AS was 40/60 (wt %). 7.11 g of the resulting polymer was taken, and Soxhlet extraction was performed for 9 hours under reflux using 150 ml of THF. The extraction residue was dried under reduced pressure to give 6.76 g of a polymer. 1H-NMR analysis of the extracted sample showed that the compositional ratio PP/AS was 42/58 (wt %).

Example 31

Synthesis of PP-AS Hybrid Polymer

Into a sufficiently nitrogen-purged glass reactor having an internal volume of 500 ml, were placed 25 g of the halogenated polypropylene obtained in [Production Example 20], 168 ml of St, and 41 ml of AN, and the mixture was stirred at 25° C. To this slurry were added 387 mg of copper (I) bromide, and 1.11 ml of PMDETA, followed by polymerization at 80° C. for 4 hours. The reaction liquid was poured into 1.5 L of methanol, and the precipitated polymer was dried under reduced pressure to give 31.3 g of a solid polymer. 1H-NMR analysis showed that the compositional ratio PP/AS was 80/20 (wt %).

Example 32

Synthesis of PP-PMMA Hybrid Polymer

Into a sufficiently nitrogen-purged glass reactor having an internal volume of 500 ml, were placed 15 g of the halogenated polypropylene obtained in [Production Example 21], 430 ml of acetone, and 53.4 ml of MMA, and the mixture was stirred at 25° C. To this slurry were added 229 mg of copper (I) bromide, and 0.67 ml of PMDETA, followed by polymerization at 55° C. for 1 hour. The reaction liquid was poured into 1.5 L of methanol, and the precipitated polymer was dried under reduced pressure to give 17.0 g of a solid polymer. 1H-NMR analysis showed that the compositional ratio PP/PMMA was 88/12 (wt %).

Example 33

Synthesis of PP-PMMA Hybrid Polymer

A solid polymer was obtained in an amount of 17.9 g in the same manner as that of Example 32 except that the polymerization time was 2 hours. 1H-NMR analysis showed that the compositional ratio PP/PMMA was 84/16 (wt %).

Example 34

Synthesis of PP-PMMA Hybrid Polymer

A solid polymer was obtained in an amount of 24.4 g in the same manner as that of Example 32 except that the polymerization time was 4 hours. 1H-NMR analysis showed that the compositional ratio PP/PMMA was 61/39 (wt %).

Example 35

Synthesis of PP-Polyethyl Acrylate (PEA) Hybrid Polymer

Into a sufficiently nitrogen-purged glass reactor having an internal volume of 500 ml, were placed 15 g of the halogenated polypropylene obtained in [Production Example 21], 246 ml of xylene, and 54.5 ml of ethyl acrylate (EA), and the mixture was heated and stirred at 110° C. to dissolve them. To this solution were added 229 mg of copper (I) bromide and 0.67 ml of PMDETA, followed by polymerization at 110° C. for 4 hours. The reaction liquid was poured into 1.5 L of methanol, and the precipitated polymer was dried under reduced pressure to give 21.2 g of a solid polymer. 1H-NMR analysis showed that the compositional ratio PP/PEA was 71/29 (wt %). 3.80 g of the resulting polymer was taken, and Soxhlet extraction was performed for 9 hours under reflux using 150 ml of THF. The extraction residue was dried under reduced pressure to give 3.56 g of a polymer. 1H-NMR analysis of the extracted sample showed that the compositional ratio PP/PEA was 76/24 (wt %).

Example 36

Synthesis of PP-poly-t-butyl Acrylate (PtBuA) Hybrid Polymer

Into a sufficiently nitrogen-purged glass reactor having an internal volume of 500 ml, were placed 15 g of the halogenated polypropylene obtained in [Production Example 21], 227 ml of xylene, and 73.2 ml of t-butyl acrylate (tBuA), and the mixture was heated and stirred at 110° C. to dissolve them. To this solution were added 229 mg of copper (I) bromide, and 0.67 ml of PMDETA, followed by polymerization at 110° C. for 4 hours. The reaction liquid was poured into 1.5 L of methanol, and the precipitated polymer was dried under reduced pressure to give 24.1 g of a solid polymer. 1H-NMR analysis showed that the compositional ratio PP/PtBuA was 62/38 (wt %). 4.45 g of the resulting polymer was taken, and Soxhlet extraction was performed for 9 hours under reflux using 150 ml of THF. The extraction residue was dried under reduced pressure to give 4.17 g of a polymer. 1H-NMR analysis of the extracted sample showed that the compositional ratio PP/PtBuA was 66/34 (wt %).

Example 37

Synthesis of PP-poly(N-isopropylacrylamide) (PNIPAAm) Hybrid Polymer

Into a sufficiently nitrogen-purged glass reactor having an internal volume of 500 ml, were placed 15 g of the halogenated polypropylene obtained in [Production Example 21], 300 ml of xylene, and 56.5 g of N-isopropylacrylamide, and the mixture was heated and stirred at 110° C. to dissolve them. To this solution were added 612 mg of dichlorotris(triphenylphosphine)ruthenium and 521 mg of aluminum isopropoxide, followed by polymerization at 110° C. for 4 hours. The reaction liquid was poured into 1.5 L of methanol, and the precipitated polymer was dried under reduced pressure to give 27.4 g of a solid polymer. 1H-NMR analysis showed that the compositional ratio PP/PNIPAAm was 55/45 (wt %).

Example 38

Synthesis of PP-poly(N-isopropylacrylamide) (PNIPAAm) Hybrid Polymer

Into a sufficiently nitrogen-purged glass reactor having an internal volume of 500 ml, were placed 15 g of the halogenated polypropylene obtained in [Production Example 21], 300 ml of ethanol, and 56.5 g of N-isopropylacrylamide, and the mixture was heated and stirred at 70° C. To this slurry were added 612 mg of dichlorotris (triphenylphosphine) ruthenium and 521 mg of aluminum isopropoxide, followed by polymerization at 70° C. for 4 hours. The reaction liquid was poured into 1.5 L of methanol, and the precipitated polymer was dried under reduced pressure to give 16.2 g of a solid polymer. 1H-NMR analysis showed that the compositional ratio PP/PNIPAAm was 93/7 (wt %).

Example 39

Synthesis of PP-poly(polyethylene glycol monoacrylate) (PPEGA) Hybrid Polymer

Into a sufficiently nitrogen-purged glass reactor having an internal volume of 500 ml, were placed 15 g of the halogenated polypropylene obtained in [Production Example 21], 200 ml of xylene, and 104.0 ml of polyethylene glycol monoacrylate (PEGA), and the mixture was heated and stirred at 110° C. to dissolve them. To this solution were added 229 mg of copper (I) bromide, and 0.67 ml of PMDETA, followed by polymerization at 110° C. for 4 hours. The reaction liquid was poured into 1.5 L of methanol, and the precipitated polymer was dried under reduced pressure to give 17.2 g of a solid polymer. 1H-NMR analysis showed that the compositional ratio PP/PPEGA was 87/13 (wt %).

Example 40

Synthesis of PP-poly-2-dimethylaminoethyl acrylate (PDMAEA) Hybrid Polymer

Into a sufficiently nitrogen-purged glass reactor having an internal volume of 500 ml, were placed 15 g of the halogenated polypropylene obtained in [Production Example 21], 225 ml of xylene, and 75.8 ml of 2-dimethylaminoethyl acrylate (DMAEA), and the mixture was heated and stirred at 110° C. to dissolve them. To this solution were added 229 mg of copper (I) bromide, and 0.67 ml of PMDETA, followed by polymerization at 110° C. for 4 hours. The reaction liquid was poured into 1.5 L of methanol, and the precipitated polymer was dried under reduced pressure to give 17.4 g of a solid polymer. 1H-NMR analysis showed that the compositional ratio PP/PDMAEA was 86/14 (wt %).

Example 41

Synthesis of PP-PMMA Hybrid Polymer

Into a sufficiently nitrogen-purged glass reactor having an internal volume of 2 L, were placed 150 g of the halogenated polypropylene obtained in [Production Example 21], and 1629 ml of xylene, and the mixture was heated and stirred at 100° C. to dissolve them. To this solution were added 170.8 ml of MMA, 2.29 g of copper (I) bromide, and 6.67 ml of PMDETA, followed by polymerization at 100° C. for 30 minutes. The reaction liquid was poured into 5 L of methanol, and the precipitated polymer was dried under reduced pressure to give 179.6 g of a solid polymer. 1H-NMR analysis showed that the compositional ratio PP/PMMA was 84/16 (wt %). 4.45 g of the resulting polymer was taken, and Soxhlet extraction was performed for 9 hours under reflux using 150 ml of acetone. The extraction residue was dried under reduced pressure to give 4.44 g of a polymer. 1H-NMR analysis of the extracted sample showed that the compositional ratio PP/PMMA was 84/16 (wt %). The resulting polymer was press-molded with a heat pressing machine set at a temperature of 200° C. under the conditions of a pressure of 100 kg/cm² and a time of 5 minutes, and thereafter was rapidly cooled with a pressing machine set at a temperature of 20° C. to give a press sheet having a thickness of 0.5 mm, and a width and a length of 15 mm each. When the resulting press sheet was observed with a transmission electron microscope (TEM), island phases of PMMA having a diameter of about 50 nm were finely dispersed in a PP matrix. This observation confirmed production of a hybrid polymer in which a PP segment and a PMMA segment were bound.

Example 42

(1) Synthesis of PP-PMMA Hybrid Polymer

Into a sufficiently nitrogen-purged glass reactor having an internal volume of 2 L, were placed 100 g of the halogenated polypropylene obtained in [Production Example 21], and 1572 ml of xylene, and the mixture was heated and stirred at 100° C. to dissolve them. To this solution were added 227.7 ml of MMA, 1.53 g of copper (I) bromide, and 4.45 ml of PMDETA, followed by polymerization at 100° C. for 1 hour. The reaction liquid was poured into 5 L of methanol, and the precipitated polymer was dried under reduced pressure to give 162.2 g of a solid polymer. 1H-NMR analysis showed that the compositional ratio PP/PMMA was 62/38 (wt %). 5.13 g of the resulting polymer was taken, and Soxhlet extraction was performed for 9 hours under reflux using 150 ml of acetone. The extraction residue was dried under reduced pressure to give 4.95 g of a polymer. 1H-NMR analysis of the extracted sample showed that the compositional ratio PP/PMMA was 64/36 (wt %). The resulting polymer was press-molded with a heat pressing machine set at a temperature of 200° C. under the conditions of a pressure of 100 kg/cm² and a time of 5 minutes and, thereafter, was rapidly cooled with a pressing machine set at a temperature of 20° C. to give a press sheet having a thickness of 0.5 mm, and a width and a length of 15 mm each. When the resulting press sheet was observed with a transmission electron microscope (TEM), island phases of PMMA having a diameter of about 50 nm were finely dispersed in a PP matrix. This observation confirmed production of a hybrid polymer in which a PP segment and a PMMA segment were bound.

(2) Assessment of Compatibilizing Ability of PP-PMMA Hybrid Polymer

Into a Labo Plastomill (volume 60 cc) manufactured by Toyo Seiki Seisaku-sho, Ltd. were placed 62 parts by weight of homo PP (S119 manufactured by Prime Polymer Co., Ltd.), 38 parts by weight of PMMA (manufactured by Wako Pure Chemical Industries, Ltd.; Mw=100,000), and 5 parts by weight of the PP-PMMA hybrid polymer synthesized in (1). The mixture was kneaded under the conditions of a temperature of 240° C., a time of 5 minutes, and a rotor rotation rate of 100 rpm. The resulting mixture was press-molded with a heat pressing machine set at a temperature of 240° C. under the conditions of a pressure of 100 kg/cm² and a time of 5 minutes and, thereafter, was rapidly cooled with a pressing machine set at a temperature of 20° C. to give a press sheet having a thickness of 0.5 mm, and a width and a length of 15 mm each. TEM observation confirmed that the press sheet had a structure in which island phases of PMMA were finely dispersed in a PP matrix, and the number average domain diameter thereof was 1.60 μm.

Example 43

Synthesis of PP-PMMA Hybrid Polymer

Into a sufficiently nitrogen-purged glass reactor having an internal volume of 2 L, were placed 50 g of the halogenated polypropylene obtained in [Production Example 21] and 1572 ml of xylene, and the mixture was heated and stirred at 100° C. to dissolve them. To this solution were added 227.7 ml of MMA, 0.76 g of copper (I) bromide, and 2.22 ml of PMDETA, followed by polymerization at 100° C. for 6 hours. The reaction liquid was poured into 5 L of methanol, and the precipitated polymer was dried under reduced pressure to give 136.7 g of a solid polymer. 1H-NMR analysis showed that the compositional ratio PP/PMMA was 37/63 (wt %). 5.06 g of the resulting polymer was taken, and Soxhlet extraction was performed for 9 hours under reflux using 150 ml of acetone. The extraction residue was dried under reduced pressure to give 4.75 g of a polymer. 1H-NMR analysis of the extracted sample showed that the compositional ratio PP/PMMA was 39/61 (wt %). The resulting polymer was press-molded with a heat pressing machine set at a temperature of 200° C. under the conditions of a pressure of 100 kg/cm² and a time of 5 minutes and, thereafter, was rapidly cooled with a pressing machine set at a temperature of 20° C. to give a press sheet having a thickness of 0.5 mm, and a width and a length of 15 mm each. When the resulting press sheet was observed with a transmission electron microscope (TEM), salami structures were observed in which island phases of PMMA having a diameter of about 300 nm were finely dispersed in a PP matrix and in which PP having a diameter of about 50 nm was finely dispersed in a PMMA domain. This observation confirmed production of a hybrid polymer in which a PP segment and a PMMA segment were bound.

Comparative Example 1

TEM Observation of Simple Blend of PP/PMMA

Into a Labo Plastomill (volume 60 cc) manufactured by Toyo Seiki Seisaku-sho, Ltd., were placed 62 parts by weight of homo PP (S119 manufactured by Prime Polymer Co., Ltd.), and 38 parts by weight of PMMA (manufactured by Wako Pure Chemical Industries, Ltd.; Mw=100,000). The mixture was kneaded under the conditions of a temperature of 240° C., a time of 5 minutes, and a rotor rotation rate of 100 rpm. The resulting mixture was press-molded with a heat pressing machine set at a temperature of 240° C. under the conditions of a pressure of 100 kg/cm² and a time of 5 minutes and, thereafter, was rapidly cooled with a pressing machine set at a temperature of 20° C. to give a press sheet having a thickness of 0.5 mm, and a width and a length of 15 mm each. TEM observation confirmed that the press sheet had a structure in which island phases of PMMA were dispersed in a PP matrix, but the domains were very large with a number average domain diameter of 40 µm or more.

Example 44

Synthesis of PP-AS Hybrid Polymer

Into a sufficiently nitrogen-purged glass reactor having an internal volume of 500 ml, were placed 15 g of the halogenated polypropylene obtained in [Production Example 21], 30 ml of toluene, 160 ml of St, and 40 ml of AN, and the mixture was stirred at 25° C. To this slurry was added 14.0 mg of cyclopentadienyl iron (I) dicarbonyl dimer, followed by polymerization at 80° C. for 5 hours. The reaction liquid was poured into 1.5 L of methanol, and the precipitated polymer was dried under reduced pressure to give 35.5 g of a solid polymer. 1H-NMR analysis showed that the compositional ratio PP/AS was 42/58 (wt %). 3.29 g of the resulting polymer was taken, and Soxhlet extraction was performed for 9 hours under reflux using 150 ml of acetone. The extraction residue was dried under reduced pressure to give 2.76 g of a polymer. 1H-NMR analysis of the extracted sample showed that the compositional ratio PP/AS was 50/50 (wt %).

Example 45

Synthesis of PP-AS Hybrid Polymer

A solid polymer was obtained in an amount of 28.1 g in the same manner as that of Example 44 except that cyclopentadienyl iron (I) dicarbonyl dimer was used in an amount of 7.0 mg. 1H-NMR analysis showed that the compositional ratio PP/AS was 53/47 (wt %). 3.14 g of the resulting polymer was taken, and Soxhlet extraction was performed for 9 hours under reflux using 150 ml of acetone. The extraction residue was dried under reduced pressure to give 2.95 g of a polymer. 1H-NMR analysis of the extracted sample showed that the compositional ratio PP/AS was 57/43 (wt %).

Example 46

Synthesis of Syndiotactic PP (sPP)-PMMA Hybrid Polymer

Into a sufficiently nitrogen-purged glass reactor having an internal volume of 2 L, were placed 100 g of the halogenated syndiotactic polypropylene obtained in [Production Example 22] and 1572 ml of xylene, and the mixture was heated and stirred at 100° C. to dissolve them. To this solution were added 227.7 ml of MMA, 1.53 g of copper (I) bromide, and 4.45 ml of PMDETA, followed by polymerization at 100° C. for 25 minutes. The reaction liquid was poured into 5 L of methanol, and the precipitated polymer was dried under reduced pressure to give 137.6 g of a solid polymer. 1H-NMR analysis showed that the compositional ratio sPP/PMMA was 73/27 (wt %).

Example 47

Synthesis of EPR-PDMA Hybrid Polymer

Into a sufficiently nitrogen-purged glass reactor having an internal volume of 500 ml, were placed 15 g of the halogenated EPR obtained in [Production Example 23] and 85 ml of xylene, and the mixture was heated and stirred at 110° C. to dissolve them. To this solution were added 35.2 ml of DMA, 215 mg of copper (I) bromide, and 0.63 ml of PMDETA, followed by polymerization at 110° C. for 1.5 hours. The reaction liquid was poured into 1.5 L of methanol, and the precipitated polymer was dried under reduced pressure to give 25.3 g of a rubbery polymer. 1H-NMR analysis showed that the compositional ratio EPR/PDMA was 59/41 (wt %). Molecular weights of the polymer (relative to PS) were measured by GPC, and Mw was 232,000, Mn was 59,300, and Mw/Mn was 3.92.

Example 48

Synthesis of EPR-PDMA Hybrid Polymer

A rubbery polymer was obtained in an amount of 35.9 g in the same manner as that of Example 47 except that DMA was used in an amount of 87.9 ml and the polymerization was performed for 30 minutes. 1H-NMR analysis showed that the compositional ratio EPR/PDMA was 42/58 (wt %). Molecular weights of the polymer (relative to PS) were measured by GPC, and Mw was 393,000, Mn was 111,000, and Mw/Mn was 3.53.

Example 49

Synthesis of EPR-PDMA Hybrid Polymer

A rubbery polymer was obtained in an amount of 26.2 g in the same manner as that of Example 47 except that the halogenated EPR was replaced by one obtained in [Production Example 24]. 1H-NMR analysis showed that the compositional ratio EPR/PDMA was 57/43 (wt %).

Example 50

Synthesis of EPR-PDMA Hybrid Polymer

A rubbery polymer was obtained in an amount of 40.1 g in the same manner as that of Example 48 except that the halogenated EPR was replaced by one obtained in [Production Example 24]. 1H-NMR analysis showed that the compositional ratio EPR/PDMA was 37/63 (wt %).

Example 51

Synthesis of EBR-PS Hybrid Polymer

Into a sufficiently nitrogen-purged glass reactor having an internal volume of 500 ml, were placed 10 g of the halogenated EBR obtained in [Production Example 25] and 150 ml of St, and the mixture was heated and stirred at 90° C. to dissolve them. To this solution were added 300 ml of distilled water, 43 mg of copper (I) bromide, and 0.13 ml of PMDETA, followed by polymerization at 90° C. for 6 hours. The reaction liquid was poured into 1.5 L of methanol, and the precipitated polymer was dried under reduced pressure to give 30.3 g of a solid polymer. 1H-NMR analysis showed that the compositional ratio EBR/PS was 33/67 (wt %).

Example 52

Synthesis of EBR-PS Hybrid Polymer

Into a sufficiently nitrogen-purged glass reactor having an internal volume of 500 ml, were placed 10 g of the halogenated EBR obtained in [Production Example 25] and 100 ml of St, and the mixture was heated and stirred at 90° C. to dissolve them. To this solution were added 300 ml of distilled water, 5 ml of polyethylene glycol monolaurate, 43 mg of copper (I) bromide, and 0.13 ml of PMDETA, followed by polymerization at 90° C. for 6 hours. The reaction liquid was poured into 1.5 L of methanol, and the precipitated polymer was dried under reduced pressure to give 26.1 g of a solid polymer. 1H-NMR analysis showed that the compositional ratio EBR/PS was 38/62 (wt %).

Example 53

Synthesis of EBR-PMMA Hybrid Polymer

Into a sufficiently nitrogen-purged glass reactor having an internal volume of 500 ml, were placed 20 g of the halogenated EBR obtained in [Production Example 26], and 233.1 ml of xylene, and the mixture was heated and stirred at 100° C. to dissolve them. To this solution were added 66.9 ml of MMA, 287 mg of copper (I) bromide, and 0.84 ml of PMDETA, followed by polymerization at 100° C. for 4 hours. The reaction liquid was poured into 1.5 L of methanol, and the precipitated polymer was dried under reduced pressure to give 29.21 g of a solid polymer. 1H-NMR analysis showed that the compositional ratio EBR/PMMA was 68/32 (wt %).

Example 54

Synthesis of TPX-PMMA Hybrid Polymer

Into a sufficiently nitrogen-purged glass reactor having an internal volume of 500 ml, were placed 20 g of the halogenated TPX obtained in [Production Example 27], 233.1 ml of xylene, and 66.9 ml of MMA, and the mixture was heated and stirred at 100° C. to dissolve them. To this solution were added 287 mg of copper (I) bromide, and 0.84 ml of PMDETA, followed by polymerization at 100° C. for 18 minutes. The reaction liquid was poured into 1.5 L of methanol, and the precipitated polymer was dried under reduced pressure to give 25.6 g of a solid polymer. 1H-NMR analysis showed that the compositional ratio TPX/PMMA was 78/22 (wt %). 5.26 g of the resulting polymer was taken, and Soxhlet extraction was performed for 9 hours under reflux using 150 ml of acetone. The extraction residue was dried under reduced pressure to give 5.12 g of a polymer. 1H-NMR analysis of the extracted sample showed that the compositional ratio TPX/PMMA was 80/20 (wt %).

Example 55

Synthesis of COC-PMMA Hybrid Polymer

Into a sufficiently nitrogen-purged glass reactor having an internal volume of 500 ml, were placed 20 g of the halogenated COC obtained in [Production Example 28], 314.5 ml of xylene, and 45.5 ml of MMA, and the mixture was heated and stirred at 100° C. to dissolve them. To this solution were added 305 mg of copper (I) bromide, and 0.89 ml of PMDETA, followed by polymerization at 100° C. for 4 hours. The reaction liquid was poured into 1.5 L of methanol, and the precipitated polymer was dried under reduced pressure to give 22.2 g of a solid polymer. 1H-NMR analysis showed that the compositional ratio COC/PMMA was 90/10 (wt %).

Example 56

Synthesis of COC-PMMA Hybrid Polymer

Into a sufficiently nitrogen-purged glass reactor having an internal volume of 500 ml, were placed 20 g of the halogenated COC obtained in [Production Example 28], 233.1 ml of xylene, and 66.9 ml of MMA, and the mixture was heated and stirred at 100° C. to dissolve them. To this solution were added 287 mg of copper (I) bromide, and 0.84 ml of PMDETA, followed by polymerization at 100° C. for 7 hours. The reaction liquid was poured into 1.5 L of methanol, and the precipitated polymer was dried under reduced pressure to give 30.5 g of a solid polymer. 1H-NMR analysis showed that the compositional ratio COC/PMMA was 66/34 (wt %).

Example 57

Synthesis of EEA-PMMA Hybrid Polymer

Into a sufficiently nitrogen-purged glass reactor having an internal volume of 500 ml, were placed 7.1 g of the halogenated EEA obtained in [Production Example 29], 300 ml of xylene, and 32.1 ml of MMA, and the mixture was heated and stirred at 100° C. to dissolve them. To this solution were added 538 mg of copper (I) bromide, 1.57 ml of PMDETA, and 41.9 mg of copper (II) bromide, followed by polymerization at 100° C. for 4 hours. The reaction liquid was poured into 1.5 L of methanol, and the precipitated polymer was dried under reduced pressure to give 11.1 g of a rubbery polymer. 1H-NMR analysis showed that the compositional ratio EEA/PMMA was 64/36 (wt %).

Example 58

Synthesis of Ethylene/Methacrylic Acid Copolymer-PMMA Hybrid Polymer

A rubbery polymer was obtained in an amount of 15.1 g in the same manner as that of Example 57 except that 10.7 g of the halogenated ethylene/methacrylic acid copolymer obtained in [Production Example 30] was used in place of the halogenated EEA. 1H-NMR analysis showed that the compositional ratio ethylene/methacrylic acid copolymer/PMMA was 71/29 (wt %).

Example 59

Synthesis of Maleinized PP-PMMA Hybrid Polymer

Into a sufficiently nitrogen-purged glass reactor having an internal volume of 500 ml, were placed 14.6 g of the halogenated maleinized PP obtained in [Production Example 31], 62.9 ml of xylene, and 17.1 ml of MMA, and the mixture was heated and stirred at 90° C. to dissolve them. To this solution were added 287 mg of copper (I) bromide, and 0.84 ml of PMDETA, followed by polymerization at 90° C. for 15 minutes. The reaction liquid was poured into 1 L of methanol, and the precipitated polymer was dried under reduced pressure to give 24.5 g of a solid polymer. 1H-NMR analysis showed that the compositional ratio PP/PMMA was 59/41 (wt %).

Example 60

Synthesis of maleinized PP-AS Hybrid Polymer

Into a sufficiently nitrogen-purged glass reactor having an internal volume of 500 ml, were placed 14.6 g of the halogenated maleinized PP obtained in [Production Example 31], 34.4 ml of xylene, 33 ml of St, and 12.6 ml of AN, and the mixture was heated and stirred at 100° C. to dissolve them. To this solution were added 287 mg of copper (I) bromide, and 0.84 ml of PMDETA, followed by polymerization at 100° C. for 6 hours. The reaction liquid was poured into 1.5 L of methanol, and the precipitated polymer was dried under reduced pressure to give 22.0 g of a solid polymer. 1H-NMR analysis showed that the compositional ratio PP/AS was 66/34 (wt %).

Example 61

Synthesis of Maleinized PP-poly-2-hydroxyethyl Methacrylate (PHEMA) Hybrid Polymer Into a sufficiently nitrogen-purged glass reactor having an internal volume of 500 ml, were placed 14.6 g of the halogenated maleinized PP obtained in [Production Example 31], 140 ml of ethanol, and 19.4 ml of 2-hydroxyethyl methacrylate (HEMA), and the mixture was stirred at 25° C. To this slurry were added 287 mg of copper (I) bromide, and 0.84 ml of PMDETA, followed by polymerization at 25° C. for 4 hours. The reaction liquid was filtered with a glass filter, and the polymer on the filter was dried under reduced pressure to give 32.4 g of a solid polymer. Elementary analysis showed that the compositional ratio PP/PHEMA was 45/55 (wt %).

Example 62

Synthesis of Maleinized PP-PtBuA Hybrid Polymer

Into a sufficiently nitrogen-purged glass reactor having an internal volume of 500 ml, were placed 14.6 g of the halogenated maleinized PP obtained in [Production Example 31], 57 ml of xylene, and 23.4 ml of tBuA, and the mixture was heated and stirred at 90° C. to dissolve them. To this solution were added 287 mg of copper (I) bromide, and 0.84 ml of PMDETA, followed by polymerization at 90° C. for 4 hours. The reaction liquid was poured into 1 L of methanol, and the precipitated polymer was dried under reduced pressure to give 22.7 g of a solid polymer. 1H-NMR analysis showed that the compositional ratio PP/PtBuA was 64/36 (wt %).

Example 63

Synthesis of Maleinized PP-PtBuA Hybrid Polymer

A solid polymer was obtained in an amount of 28.7 g in the same manner as that of Example 62 except that tBuA was used in an amount of 164.1 ml. 1H-NMR analysis showed that the compositional ratio PP/PtBuA was 51/49 (wt %).

Example 64

Synthesis of Maleinized PP-PHEMA Hybrid Polymer

Into a sufficiently nitrogen-purged glass reactor having an internal volume of 500 ml, were placed 15 g of the halogenated maleinized PP obtained in [Production Example 31], 300 ml of xylene, and 10 ml of HEMA, and the mixture was stirred at 25° C. To this slurry were added 296 mg of copper (I) bromide, and 0.86 ml of PMDETA, followed by polymerization at 25° C. for 4 hours. The reaction liquid was poured into 1.5 L of methanol, and the precipitated polymer was dried under reduced pressure to give 23.9 g of a solid polymer. Elementary analysis showed that the compositional ratio PP/PHEMA was 63/37 (wt %).

Example 65

Synthesis of Maleinized PP-PHEMA Hybrid Polymer

A solid polymer was obtained in an amount of 34.1 g in the same manner as that of Example 64 except that HEMA was used in an amount of 20 ml. Elementary analysis showed that the compositional ratio PP/PHEMA was 44/56 (wt %).

Example 66

Synthesis of Maleinized PP-PHEMA Hybrid Polymer

A solid polymer was obtained in an amount of 43.4 g in the same manner as that of Example 64 except that HEMA was used in an amount of 30 ml. Elementary analysis showed that the compositional ratio PP/PHEMA was 35/65 (wt %).

Example 67

Synthesis of Maleinized PP-PHEMA Hybrid Polymer

A solid polymer was obtained in an amount of 52.4 g in the same manner as that of Example 64 except that HEMA was used in an amount of 40 ml. Elementary analysis showed that the compositional ratio PP/PHEMA was 29/71 (wt %).

Example 68

Synthesis of Maleinized PP-PDMA Hybrid Polymer

Into a sufficiently nitrogen-purged glass reactor having an internal volume of 500 ml, were placed 15 g of the halogenated maleinized PP obtained in [Production Example 31], 200 ml of xylene, and 24.2 ml of DMA, and the mixture was heated and stirred at 100° C. to dissolve them. To this solution were added 296 mg of copper (I) bromide, and 0.86 ml of PMDETA, followed by polymerization at 100° C. for 4 hours. The reaction liquid was poured into 1.5 L of methanol, and the precipitated polymer was dried under reduced pressure to give 27.8 g of a solid polymer. 1H-NMR analysis showed that the compositional ratio PP/PDMA was 54/46 (wt %).

Example 69

Synthesis of Maleinized PP-PNIPAAm Hybrid Polymer

Into a sufficiently nitrogen-purged glass reactor having an internal volume of 500 ml, were placed 15 g of the halogenated maleinized PP obtained in [Production Example 31], 80 ml of xylene, and 9.3 g of NIPAAm, and the mixture was heated and stirred at 100° C. to dissolve them. To this solution were added 791 mg of dichlorotris(triphenylphosphine)ruthenium and 674 mg of aluminum isopropoxide, followed by polymerization at 100° C. for 3 minutes. The reaction liquid was poured into 1.5 L of methanol, and the precipitated polymer was dried under reduced pressure to give 16.9 g of a solid polymer. 1H-NMR analysis showed that the compositional ratio PP/PNIPAAm was 89/11 (wt %).

Example 70

Synthesis of Maleinized PP-PMMA Hybrid Polymer

Into a sufficiently nitrogen-purged glass reactor having an internal volume of 500 ml, were placed 15 g of the halogenated maleinized PP obtained in [Production Example 31], 200 ml of xylene, and 8.8 ml of MMA, and the mixture was heated and stirred at 100° C. to dissolve them. To this solution were added 296 mg of copper (I) bromide, 0.86 ml of PMDETA, and 23 mg of copper (II) bromide, followed by polymerization at 100° C. for 4 hours. The reaction liquid was poured into 1.5 L of methanol, and the precipitated polymer was dried under reduced pressure to give 18.1 g of a solid polymer. 1H-NMR analysis showed that the compositional ratio PP/PMMA was 83/17 (wt %). Molecular weights of the polymer (relative to PS) were measured by GPC, and Mw was 187,000, Mn was 57,900, and Mw/Mn was 3.22.

Example 71

Synthesis of Maleinized PP-PMMA Hybrid Polymer

A solid polymer was obtained in an amount of 23.5 g in the same manner as that of Example 70 except that MMA was used in an amount of 17.7 ml. 1H-NMR analysis showed that the compositional ratio PP/PMMA was 64/36 (wt %). Molecular weights of the polymer (relative to PS) were measured by GPC, and Mw was 157,000, Mn was 31,300, and Mw/Mn was 5.01.

Example 72

Synthesis of Maleinized PP-PMMA Hybrid Polymer

A solid polymer was obtained in an amount of 35.1 g in the same manner as that of Example 70 except that MMA was used in an amount of 35.3 ml. 1H-NMR analysis showed that the compositional ratio PP/PMMA was 43/57 (wt %). Molecular weights of the polymer (relative to PS) were measured by GPC, and Mw was 210,000, Mn was 35,400, and Mw/Mn was 5.92.

Example 73

Synthesis of Maleinized COC-PMMA Hybrid Polymer

Into a sufficiently nitrogen-purged glass reactor having an internal volume of 500 ml, were placed 15 g of the halogenated maleinized COC obtained in [Production Example 32], 200 ml of xylene, and 17 ml of MMA, and the mixture was heated and stirred at 100° C. to dissolve them. To this solution were added 287 mg of copper (I) bromide, and 0.84 ml of PMDETA, followed by polymerization at 100° C. for 4 hours. The reaction liquid was poured into 1.5 L of methanol, and the precipitated polymer was dried under reduced pressure to give 23.7 g of a solid polymer. 1H-NMR analysis showed that the compositional ratio COC/PMMA was 63/37 (wt %).

Example 74

Synthesis of Powdery PP-AS Hybrid Polymer

Into a sufficiently nitrogen-purged glass reactor having an internal volume of 500 ml, were placed 25 g of the powdery halogenated polypropylene obtained in [Production Example 34], 194.4 ml of St, and 48.0 ml of AN, and the mixture was stirred at 25° C. To this slurry were added 258 mg of copper (I) bromide, and 0.75 ml of PMDETA, followed by polymerization at 85° C. for 4 hours. The reaction liquid was poured into 1.5 L of methanol, and the precipitated polymer was dried under reduced pressure to give 32.7 g of a white powdery polymer. The resulting powder had a bulk density of 0.30 g/ml, an average particle diameter of 240 μm, and a Cu content by an ICP emission spectroscopy of 22 ppm. 1H-NMR analysis showed that the compositional ratio PP/AS was 77/23 (wt %).

Example 75

Synthesis of PP-PMMA Hybrid Polymer

Into a sufficiently nitrogen-purged glass reactor having an internal volume of 500 ml, were placed 14.6 g of the modified polypropylene obtained in [Production Example 35], and 55 ml of xylene, and the mixture was heated and stirred at 90° C. to dissolve them. To this solution were added 17 ml of MMA, 0.29 g of copper (I) bromide, and 0.84 ml of PMDETA, followed by polymerization at 90° C. for 2 hours. The reaction liquid was poured into 1 L of methanol, and the precipitated polymer was dried under reduced pressure to give 24.5 g of a solid polymer. 1H-NMR analysis showed that the compositional ratio PP/PMMA was 62/38 (wt %).

Comparative Example 2

Into a sufficiently nitrogen-purged glass reactor having an internal volume of 500 ml, were placed 14.6 g of the maleic anhydride-modified polypropylene (a bromine atom was not detected by ion chromatography analysis) used in [Production Example 31], and 57 ml of xylene, and the mixture was heated and stirred at 90° C. to dissolve them. To this solution were added 23 ml of t-butyl acrylate (tBuA), 0.29 g of copper (I) bromide, and 0.84 ml of PMDETA, followed by polymerization at 90° C. for 4 hours. The reaction liquid was poured into 1 L of methanol, and the precipitated polymer was dried under reduced pressure to give 13.8 g of a solid polymer. 1H-NMR analysis did not provide any signals based on tBuA.

Example 76

Synthesis of PP-PMMA Hybrid Polymer

Into a sufficiently nitrogen-purged glass reactor having an internal volume of 500 ml, were placed 10 g of the halogenated polypropylene obtained in [Production Example 18], and 100 ml of xylene, and the mixture was heated and stirred at 100° C. to dissolve them. To this solution were added 13 ml of methyl methacrylate (MMA), 0.43 g of copper (I) bromide, and 1.24 ml of N,N,N',N'',N''-pentamethyldiethylenetriamine (PMDETA), followed by polymerization at 100° C. for 4 hours. The reaction liquid was poured into 1 L of methanol, and the precipitated polymer was dried under reduced pressure to give 15.2 g of a solid polymer. 5.9 g of the resulting polymer was taken out, and Soxhlet extraction was performed for 8 hours under reflux using 200 ml of THF. The extraction residue was dried under reduced pressure to give 5.7 g of a polymer. 1H-NMR analysis of the extracted sample showed that the compositional ratio PP/PMMA was 61/39 (wt %).

Example 77

Synthesis of PP-PMMA Hybrid Polymer

Into a sufficiently nitrogen-purged glass reactor having an internal volume of 500 ml, were placed 10 g of the halogenated polypropylene obtained in [Production Example 8], and 200 ml of xylene, and the mixture was heated and stirred at 100° C. to dissolve them. To this solution were added 11 ml of MMA, 0.57 g of copper (I) bromide, and 1.67 ml of PMDETA, followed by polymerization at 100° C. for 4 hours. The reaction liquid was poured into 1 L of methanol, and the precipitated polymer was dried under reduced pressure to give 11.9 g of a solid polymer. 1H-NMR analysis showed that the compositional ratio PP/PMMA was 86/14 (wt %).

Example 78

Synthesis of PP-AS Hybrid Polymer

Into a sufficiently nitrogen-purged glass reactor having an internal volume of 500 ml, were placed 21.8 g of the halogenated polypropylene obtained in [Production Example 36], and 126 ml of xylene, and the mixture was heated and stirred at 100° C. to dissolve them. To this solution were added 82 ml of St, 28 ml of AN, 0.44 g of copper (I) bromide, and 1.26 ml of PMDETA, followed by polymerization at 100° C. for 4 hours. The reaction liquid was poured into 1 L of methanol, and the precipitated polymer was dried under reduced pressure to give 29.8 g of a solid polymer. 1H-NMR analysis showed that the compositional ratio propylene/St/AN was 82/12/6 (mole %).

Example 79

Synthesis of PP-AS Hybrid Polymer

Into a sufficiently nitrogen-purged glass reactor having an internal volume of 500 ml, were placed 15 g of the halogenated polypropylene obtained in [Production Example 21], and 300 ml of anisole, and the mixture was heated and stirred at 110° C. to give a slurry. To this slurry were added 77 ml of St, 19 ml of AN, 0.23 g of copper (I) bromide, and 0.67 ml of PMDETA, followed by polymerization at 110° C. for 4 hours. The reaction liquid was poured into 1 L of methanol, and this was filtered. The residue was dried under reduced pressure to give 24.0 g of a solid polymer. 1H-NMR analysis showed that the compositional ratio propylene/St/AN was 63/24/13 (mole %)

Example 80

Synthesis of Powdery PP-AS Hybrid Polymer

Into a sufficiently nitrogen-purged glass reactor having an internal volume of 500 ml, were placed 15 g of the powdery halogenated polypropylene obtained in [Production Example 40], 160 ml of St, and 40 ml of AN, and the mixture was stirred at 25° C. To this slurry were added 189 mg of copper (I) bromide, 0.55 ml of PMDETA, and 26 ml of toluene, followed by polymerization at 80° C. for 6 hours. The reaction liquid was poured into 1.5 L of methanol, and the precipitated polymer was dried under reduced pressure to give 19.7 g of a white powdery polymer. The powder had a bulk density of 0.15 g/ml, an average particle diameter of 40 μm, and a Cu content by an ICP emission spectroscopy of 10 ppm. 1H-NMR analysis showed that the compositional ratio PP/AS was 76/24 (wt %).

Example 81

Synthesis of PP-AS Hybrid Polymer, and Alkali Degradation Test

Into a sufficiently nitrogen-purged glass reactor having an internal volume of 500 ml, were placed 15 g of the halogenated polypropylene obtained in [Production Example 21], 160 ml of St, and 40 ml of AN, and the mixture was stirred at 25° C. To this slurry were added 379 mg of copper (I) bromide, and 1.10 ml of PMDETA, followed by polymerization at 80° C. for 5 hours. The reaction liquid was poured into 1.5 L of methanol, and the precipitated polymer was dried under reduced pressure to give 22.8 g of a solid polymer. 3.42 g of the resulting polymer was taken, and Soxhlet extraction was performed for 9 hours under reflux using 150 ml of acetone. The extraction residue was dried under reduced pressure to give 3.27 g of a polymer. 1H-NMR analysis of the extracted sample showed that the compositional ratio PP/AS was 69/31 (wt %). 2.1 g of the extracted sample was taken into a Schlenk tube having an internal volume of 100 ml, 60 ml of chlorobenzene and 20 ml of methanol were added, and the mixture was heated and stirred at 80° C. under nitrogen gas stream. After 1 hour, 6 ml of a (28%) solution of sodium methoxide in methanol was added, followed by heating to reflux at 80° C. for 8 hours. The reaction liquid was poured into 400 ml of methanol, followed by stirring. The mixture was filtered with a Kiriyama funnel, and the solid on the filter was added to 100 ml of THF, followed by stirring. This slurry was filtered again, and the filtrate was concentrated to give 0.06 g of a colorless transparent film-like solid. The solid on the filter was dried under reduced pressure and the resultant product weighed 2.01 g. Therefore, 0.06 g/2.1 g=2.9 wt % of the components were degraded from the PP-AS hybrid polymer in the alkali degradation test under the above conditions; the bonds between the PP segment and the AS segment were hardly broken.

Comparative Example 3

(1) Synthesis of Halogenated Polypropylene

Into a 2-L degassed and nitrogen-purged glass reactor, was placed 170 g of propylene/10-undecene-1-ol copolymer (Mw=106,000, Mw/Mn=1.88, comonomer content 0.12 mol %) which had been produced in accordance with a method disclosed in JP-A No. 2002-145944. Subsequently, 1700 ml of hexane, and 9.2 ml of 2-bromoisobutyric acid bromide were added, followed by heating and stirring at 60° C. for 2 hours. After the reaction, the resulting slurry was filtered, and the residue was dried under reduced pressure to give 169.5 g of a white solid polymer. 1H-NMR analysis showed that the polymer was polypropylene in which 94% of OH groups were modified with 2-bromoisobutyric acid group.

(2) Synthesis of PP-AS Hybrid Polymer and Alkali Degradation Test

Into a sufficiently nitrogen-purged glass reactor having an internal volume of 500 ml, were placed 15 g of the halogenated polypropylene obtained in (1), 120 ml of St, 30 ml of AN, and 26 ml of toluene, and the mixture was stirred at 25° C. To this slurry were added 189 mg of copper (I) bromide, and 0.55 ml of PMDETA, followed by polymerization at 80° C. for 4 hours. The reaction liquid was poured into 1.5 L of methanol, and the precipitated polymer was dried under reduced pressure to give 20.9 g of a solid polymer. 5.16 g of the resulting polymer was taken, and Soxhlet extraction was performed for 9 hours under reflux using 150 ml of acetone. The extraction residue was dried under reduced pressure to give 5.07 g of a polymer. 1H-NMR analysis of the extracted sample showed that the compositional ratio PP/AS was 63/37 (wt %). 1.0 g of the extracted sample was taken into a Schlenk tube having an internal volume of 100 ml, 30 ml of chlorobenzene and 10 ml of methanol were added, and the mixture was heated and stirred at 80° C. under nitrogen gas stream. After 1 hour, 3 ml of a (28%) solution of sodium methoxide in methanol was added, followed by heating to reflux at 80° C. for 8 hours. The reaction liquid was poured into 400 ml of methanol, followed by stirring. The mixture was filtered with a Kiriyama funnel, and the solid on the filter was added to 100 ml of THF, followed by stirring. This slurry was filtered again, and the filtrate was concentrated to give 0.35 g of a colorless transparent film-like solid. Therefore, 0.35 g/1.0 g=35 wt % of the components were degraded from the PP-AS hybrid polymer in the alkali degradation test under the above conditions; the bonds between the PP segment and the AS segment were broken, and most of the AS segments were extracted with THF.

The invention claimed is:

1. A method for producing a hybrid polymer having a structure in which a polyolefin segment (A) and a polar polymer segment (B) are connected together with a carbon-carbon bond, comprising polymerizing a radically polymerizable monomer by atom transfer radical polymerization in a non-molten state using a halogenated polyolefin (A') as a macro-initiator, the halogenated polyolefin being a powder having an average particle diameter of 1 to 1000 μm and a bulk density of 0.10 to 0.50 g/cm³, the polyolefin segment (A) being derived from the halogenated polyolefin (A') obtained by halogenating a polyolefin (A") which has a molecular weight distribution (Mw/Mn) of 1.5 or more and which is selected from the group consisting of the following (A1) to (A5), the halogenating requiring the use of bromine, N-bromosuccinimide, N-bromocaprolactam, N-bromophthalimide, 1,3-dibromo-5,5-dimethylhydantoin, N-bromoglutarimide, or N, N'-dibromoisocyanuric acid as a halogenating agent, the halogenated polyolefin (A') having a halogen content of 0.01 to 11 wt %, the halogenated polyolefin (A') having a carbon-halogen bond present at an α-position of a carbon-carbon double bond, or a structure in which a plurality of halogens are bonded to one carbon atom, the polar polymer segment (B) being a homopolymer or a copolymer of one or more kinds of monomers selected from radically polymerizable monomers, the hybrid polymer being a powder comprising 1 to 99 parts by weight of the polyolefin segment (A) and 1 to 99 parts by weight of the polar polymer segment (B), and having a transition metal content of 100 ppm or less, an average particle diameter of 1 to 1000 μm and a bulk density of 0.10 to 0.90 g/cm³, (A1) a homopolymer or a copolymer of α-olefin compounds represented by $CH_2=CH-C_xH_{2x+1}$ (x is 0 or a positive integer), (A2) a copolymer of an α-olefin compound represented by $CH_2=CH-C_xH_{2x+1}$ (x is 0 or a positive integer) and a monoolefin compound having an aromatic ring, (A3) a copolymer of an α-olefin compound represented by $CH_2=CH-C_xH_{2x+1}$ (x is 0 or a positive integer) and a cyclic monoolefin compound represented by the following general formula (1), (A4) a random copolymer of an α-olefin compound represented by $CH_2=CH-C_xH_{2x+1}$ (x is 0 or a positive integer) and an unsaturated carboxylic acid or a derivative thereof, (A5) a polyolefin obtained by modifying the polymer represented by any of (A1) to (A4) with an unsaturated carboxylic acid or a derivative thereof,

[Chemical formula 1]

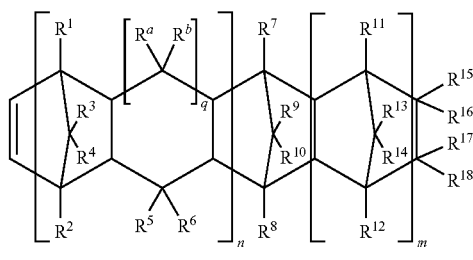

(1)

(In the formula (1), n is 0 or 1, m is 0 or a positive integer, q is 0 or 1, $R^1$ to $R^{18}$, $R^a$ and $R^b$ each represent independently an atom or a group selected from the group consisting of a hydrogen atom, a halogen atom and a hydrocarbon group, and $R^{15}$ to $R^{18}$ may be linked together to form a ring or rings).

2. The method for producing the hybrid polymer according to claim 1, wherein the hybrid polymer has a melt flow rate at 230° C. and a load of 2.16 kg in the range of 0.01 to 50 g/10 min.

3. The method for producing the hybrid polymer according to claim 1, wherein the powder of the halogenated polyolefin (A') has an average particle diameter of 1 to 500 μm.

4. The method for producing the hybrid polymer according to claim 1, wherein the radically polymerizable monomer is an organic compound selected from (meth)acrylic acid and derivatives thereof, (meth)acrylonitrile, styrene and derivatives thereof, (meth)acrylamide and derivatives thereof, maleic acid and derivatives thereof, maleimide and derivatives thereof, vinyl esters, conjugated dienes, and halogen-containing olefins.

5. The method for producing the hybrid polymer according to claim 1, wherein the halogenated polyolefin (A') has a halogen content of 0.01 to 0.55 wt %.

* * * * *